(12) United States Patent
Fukuoka et al.

(10) Patent No.: US 7,961,695 B2
(45) Date of Patent: Jun. 14, 2011

(54) RADIO COMMUNICATION BASE STATION DEVICE AND RADIO COMMUNICATION METHOD

(75) Inventors: Masaru Fukuoka, Ishikawa (JP); Akihiko Nishio, Kanagawa (JP); Seigo Nakao, Kanagawa (JP); Katsuhiko Hiramatsu, Leuven (JP)

(73) Assignee: Panasonic Corporation, Osaka (JP)

( * ) Notice: Subject to any disclaimer, the term of this patent is extended or adjusted under 35 U.S.C. 154(b) by 6 days.

(21) Appl. No.: 12/522,781

(22) PCT Filed: Jan. 11, 2008

(86) PCT No.: PCT/JP2008/050298
§ 371 (c)(1),
(2), (4) Date: Jul. 10, 2009

(87) PCT Pub. No.: WO2008/084859
PCT Pub. Date: Jul. 17, 2008

(65) Prior Publication Data
US 2010/0061359 A1 Mar. 11, 2010

(30) Foreign Application Priority Data

Jan. 12, 2007 (JP) ................................. 2007-005154
Jan. 7, 2008 (JP) ................................. 2008-000795

(51) Int. Cl.
*H04B 7/216* (2006.01)
(52) U.S. Cl. ........ 370/342; 370/335; 370/328; 370/329; 370/311; 370/318; 455/63.2; 455/436; 455/453; 455/101
(58) Field of Classification Search .................. 370/342, 370/335, 328, 329, 311, 318; 455/522, 69, 455/453, 436, 101
See application file for complete search history.

(56) References Cited

U.S. PATENT DOCUMENTS

| 7,408,893 | B2* | 8/2008 | Kwak et al. .................... 370/318 |
| 2002/0168996 | A1* | 11/2002 | Terry et al. ..................... 455/522 |
| 2003/0091008 | A1* | 5/2003 | Miyoshi et al. ............... 370/335 |
| 2005/0099968 | A1* | 5/2005 | Yamano ......................... 370/311 |
| 2005/0105593 | A1* | 5/2005 | Dateki et al. .................. 375/130 |
| 2007/0060062 | A1* | 3/2007 | Wengerter et al. ........... 455/63.2 |
| 2009/0104908 | A1* | 4/2009 | Matsumoto et al. .......... 455/436 |
| 2009/0221297 | A1* | 9/2009 | Wengerter et al. ............ 455/453 |

OTHER PUBLICATIONS

International Search Report dated Apr. 15, 2008.

(Continued)

*Primary Examiner* — Charles N Appiah
*Assistant Examiner* — Michael T Vu
(74) *Attorney, Agent, or Firm* — Dickinson Wright PLLC

(57) ABSTRACT

Provided is a radio communication base station device capable of suppressing degradation of a signal error ratio characteristic for a mobile station in the vicinity of the cell center when a plurality of signals whose transmission power is to be controlled are frequency-multiplexed or code-multiplexed. In the device (100), a classification unit (118) classifies a plurality of DPCCH according to the MCS of SCCH into a plurality of groups based on the transmission power intensity. A spread code is allocated for each DPCCH according to the classification result. A spread code for spreading a response signal (ACK signal/NACK signal) is instructed to spread units (103-1 to 103-n). The spread units (103-1 to 103-n) spread the response signal by the spread code instructed from the classification unit (118). According to the classification result in the classification unit (118), a mapping unit (104) maps the response signal after the spread to one of the subcarriers constituting the OFDM symbol.

10 Claims, 18 Drawing Sheets

OTHER PUBLICATIONS

3GPP TSG RAN WG1 LTE Ad Hoc, R1-061668, Cannes, France, Jun. 27-30, 2006, Source: NTT DoCoMo, Title: "Fast Transmission Power Control in E-UTRA," Agenda Item: 6.1, Document for: Discussion and Decision, Jun. 2006, pp. 1-6.

3GPP Ran1 LTE Adhoc, R1-061900, Cannes, France, Jun. 27-Jun. 30, 2006, Agenda Item: 6.3, Source: Motorola, Title: "Downlink Acknowledgment and Group Transmit Indicator Channels," Document for: Discussion and Decision, Jun. 2006, pp. 1-4, p. 3, line 6.

3GPP TSG RAN WG1 #42 on LTE, R1-050852, London, UK, Aug. 29-Sep. 2, 2005, Source: NTT DoCoMo, Fujitsu, NEC, Title: "CQI-based Transmission Power Control for Control Channel in Evolved UTRA," Agenda Item: 10.3, Document for: Discussion and Decision, Aug. 2005, pp. 1-5.

3GPP TSG RAN WG1 Meeting #50, R1-073784, Athens, Greece, Aug. 20-24, 2007, Source: KDDI, Title: "Hybrid FDM/CDM Based Multiplexing for ACK/NACK Signals in E-UTRA Downlink," Agenda item: 7.2.3, Document for: Discussion and Decision, Aug. 2007, pp. 1-5.

3GPP TSG RAN1 #49, R1-072166, Kobe, Japan, May 7-11, 2007, Agenda Item: 7.13.1, Source: Motorola, Title; "Downlink Acknowledgment Channel," Document for: Discussion and Decision, May 2007, pp. 1-3.

* cited by examiner

| MS | MCS FOR SCCH |
|---|---|
| MS1 | MCS2 |
| MS2 | MCS4 |
| MS3 | MCS3 |
| MS4 | MCS1 |
| MS5 | MCS4 |
| MS6 | MCS4 |

FIG.9

| ORDER | MS (DPCCH) | |
|---|---|---|
| 1 | MS2 (DPCCH2) | ⎫ |
| 2 | MS5 (DPCCH5) | ⎬ SECOND GROUP |
| 3 | MS6 (DPCCH6) | ⎭ |
| | | ← THRESHOLD VALUE=MCS4 |
| 4 | MS3 (DPCCH3) | ⎫ |
| 5 | MS1 (DPCCH1) | ⎬ FIRST GROUP |
| 6 | MS4 (DPCCH4) | ⎭ |

FIG.10

| GROUP | SCCH |
|---|---|
| SECOND GROUP | SCCH1<br>SCCH2<br>SCCH3 |
| FIRST GROUP | SCCH4<br>SCCH5<br>SCCH6 |

FIG.11

| CCE#1 | CCE#2 | CCE#3 | CCE#4 | CCE#5 | CCE#6 | CCE#7 | CCE#8 |

FIG.13A

| CCE#1 | CCE#2 | CCE#3 | CCE#4 | CCE#5 | CCE#6 | CCE#7 | CCE#8 |

FIG.13B

| CCE#1 | CCE#2 | CCE#3 | CCE#4 | CCE#5 | CCE#6 | CCE#7 | CCE#8 |

FIG.13C

| SIZE OF AGGREGATION | DPCCH IN USE |
|---|---|
| 4CCE | DPCCH1,DPCCH5 |
| 2CCE | DPCCH1,DPCCH3,DPCCH5,DPCCH7 |
| 1CCE | DPCCH1,DPCCH2,DPCCH3,DPCCH4, DPCCH5,DPCCH6,DPCCH7,DPCCH8 |

← THRESHOLD VALUE

FIG.14

| SIZE OF AGGREGATION | DPCCH IN USE |
|---|---|
| 4CCE | DPCCH1,DPCCH5 |
| 2CCE | DPCCH1,DPCCH3,DPCCH5,DPCCH7 |
| 1CCE | DPCCH1,DPCCH2,DPCCH3,DPCCH4, DPCCH5,DPCCH6,DPCCH7,DPCCH8 |

← THRESHOLD VALUE

FIG.26

RADIO COMMUNICATION BASE STATION DEVICE AND RADIO COMMUNICATION METHOD

TECHNICAL FIELD

The present invention relates to a radio communication base station apparatus and a radio communication method.

BACKGROUND ART

In recent years, in the field of radio communication, especially in mobile communication, a variety of information such as images and data in addition to voice is transmitted. The demand for higher-speed transmission is expected to further increase in the future, and, to perform high-speed transmission, a radio transmission technique that utilizes limited frequency resources more effectively and achieves high transmission efficiency is in demand.

OFDM (Orthogonal Frequency Division Multiplexing) is one of radio transmission techniques to meet these demands. OFDM, which is a multicarrier communication techniques for transmitting data in parallel using a large number of subcarriers, and is known to have features of providing high frequency efficiency and reducing inter-symbol interference under a multipath environment and be effective to improve transmission efficiency.

Studies are conducted that a radio communication base station apparatus (hereinafter simply "base station") frequency-multiplexes data for a plurality of radio communication mobile station apparatuses (hereinafter simply "mobile stations") on a plurality of subcarriers using this OFDM on the downlink.

Further, studies are underway to adopt ARQ (Automatic Repeat Request) for data transmitted from a plurality of mobile stations to the base station on uplink, and frequency-multiplex and code-multiplex a response signal showing an error detection result of uplink data on a plurality of subcarriers using OFDM. An ACK (Acknowledgment) signal is fed back if there is no error on uplink data and a NACK (Negative Acknowledgment) signal is fed back if there is an error, on uplink data as response signals to the mobile stations. Further, these response signals are transmitted on DPCCHs (Dedicated Physical Control Channels). Further, in DPCCHs, transmission power is controlled for each mobile station. That is, a plurality of DPCCHs for which the transmission power is controlled individually are frequency-multiplexed and code-multiplexed on a plurality of subcarriers. At this time, as shown in FIG. 1, DPCCHs (DPCCH 1 and DPCCH 2) for mobile stations near the center of a cell (MS 1 and MS 2) are controlled at low transmission power, and DPCCHs (DPCCH 3 and DPCCH 4) for mobile stations near cell boundaries (MS 3 and MS 4) are controlled at high transmission power, and the DPCCHs are frequency-multiplexed and code-multiplexed on a plurality of subcarriers ($f_1$ to $f_8$).

Non-patent Document 1: 3GPP RAN WG1 Meeting document, R1-061900, "Downlink Acknowledgment and Group Transmit Indicator Channels", Motorola

DISCLOSURE OF INVENTION

Problems to be Solved by the Invention

As shown in FIG. 1, in the case where a plurality of DPCCHs are code-multiplexed on a plurality of subcarriers, orthogonality is lost between codes due to the influence of fading in channels, and, as a result, inter-code interference occurs between a plurality of those DPCCHs, to degrade error rate performances. At this time, the degree of degradation of error rate performances in each DPCCH depends on relative relationships between magnitudes of transmission power of DPCCHs code-multiplexed on the same frequency resources. That is, as shown in FIG. 1, when DPCCHs (DPCCH 1 and DPCCH 2) with low transmission power and DPCCHs (DPCCH 3 and DPCCH 4) with high transmission power are code-multiplexed on the same subcarriers, the DPCCHs with high transmission power have little influence of inter-code interference from the DPCCHs with low transmission power, and the error rate performances degrade little. However, the DPCCHs with low transmission power have significant influence of inter-code interference from the DPCCHs with high transmission power and the error rate performances degrade significantly. That is, the error rate performances of DPCCHs for mobile stations near the center of a cell degrade significantly.

To prevent this, it is possible to increase the transmission power for DPCCHs to mobile stations near the center of a cell, to the same level as the transmission power for DPCCHs to mobile stations near a cell boundary. However, there is an upper limit for transmission power resources in the base station, and therefore, the transmission power for all DPCCHs cannot increase.

It is therefore an object of the present invention to provide a base station and a radio communication method that can suppress the degradation of error rate performances of signals for mobile stations near the center of a cell when a plurality of signals for which transmission power is controlled are frequency-multiplexed and code-multiplexed.

Means for Solving the Problem

The base station of the present invention provides a base station code-multiplexing a plurality of dedicated control channels on a plurality of subcarriers forming a multicarrier signal and adopts a configuration including: a classification section that classifies the plurality of dedicated control channels into a plurality of groups according to a magnitude of transmission power; and a mapping section that maps the dedicated control channels belonging to a same group to the same subcarriers, to code-multiplex the dedicated control channels and maps the dedicated control channels belonging to a different group to different subcarriers, to code-multiplex the dedicated control channels.

Advantageous Effect of the Invention

According to the present invention, it is possible to suppress the degradation of error rate performances of signals for mobile stations near the center of a cell when a plurality of signals for which transmission power is controlled are frequency-multiplexed and code-multiplexed.

BRIEF DESCRIPTION OF DRAWINGS

FIG. 9 illustrates MCS setting results according to Embodiment 2;

FIG. 10 illustrates classification results according to Embodiment 2;

FIG. 11 shows a table of the SCCHs according to Embodiment 3;

FIG. 13A illustrates an aggregation example (four CCEs), according to Embodiment 4;

FIG. 13B illustrates an aggregation example (two CCEs), according to Embodiment 4;

FIG. 13C illustrates an aggregation example (one CCE), according to Embodiment 4;

FIG. 14 illustrates the correspondence relationships between the aggregation sizes and DPCCHs of use according to Embodiment 4;

FIG. 26 illustrates the correspondence relationships between the aggregation sizes and DPCCHs in use, according to Embodiments 6 and 7;

BEST MODE FOR CARRYING OUT THE INVENTION

Now, embodiments of the present invention will be described in detail with reference to the accompanying drawings.

Embodiment 1

Figure 1:
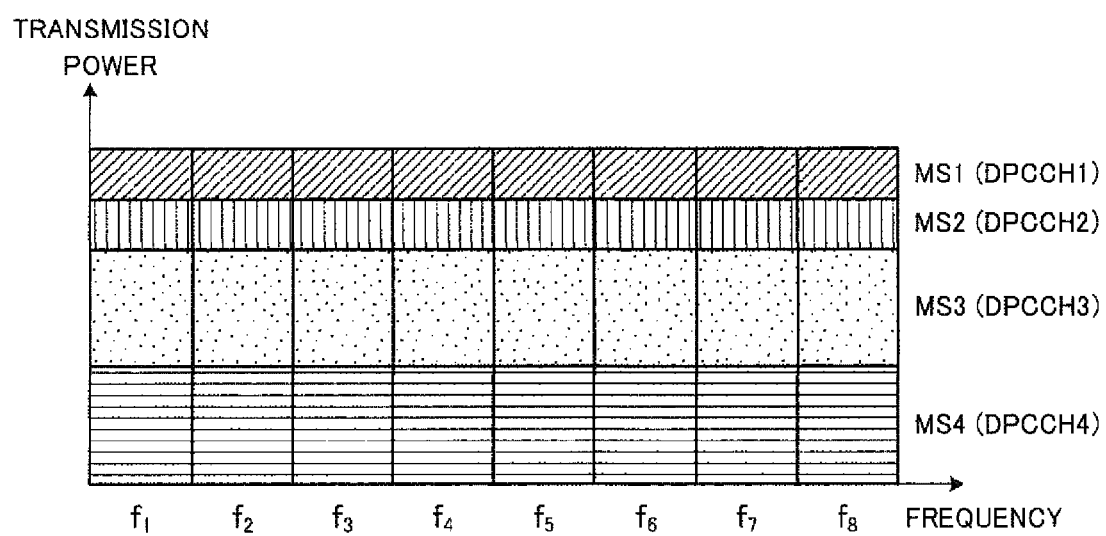
FIG. 1 is a mapping example of DPCCHs.
Figure 2:
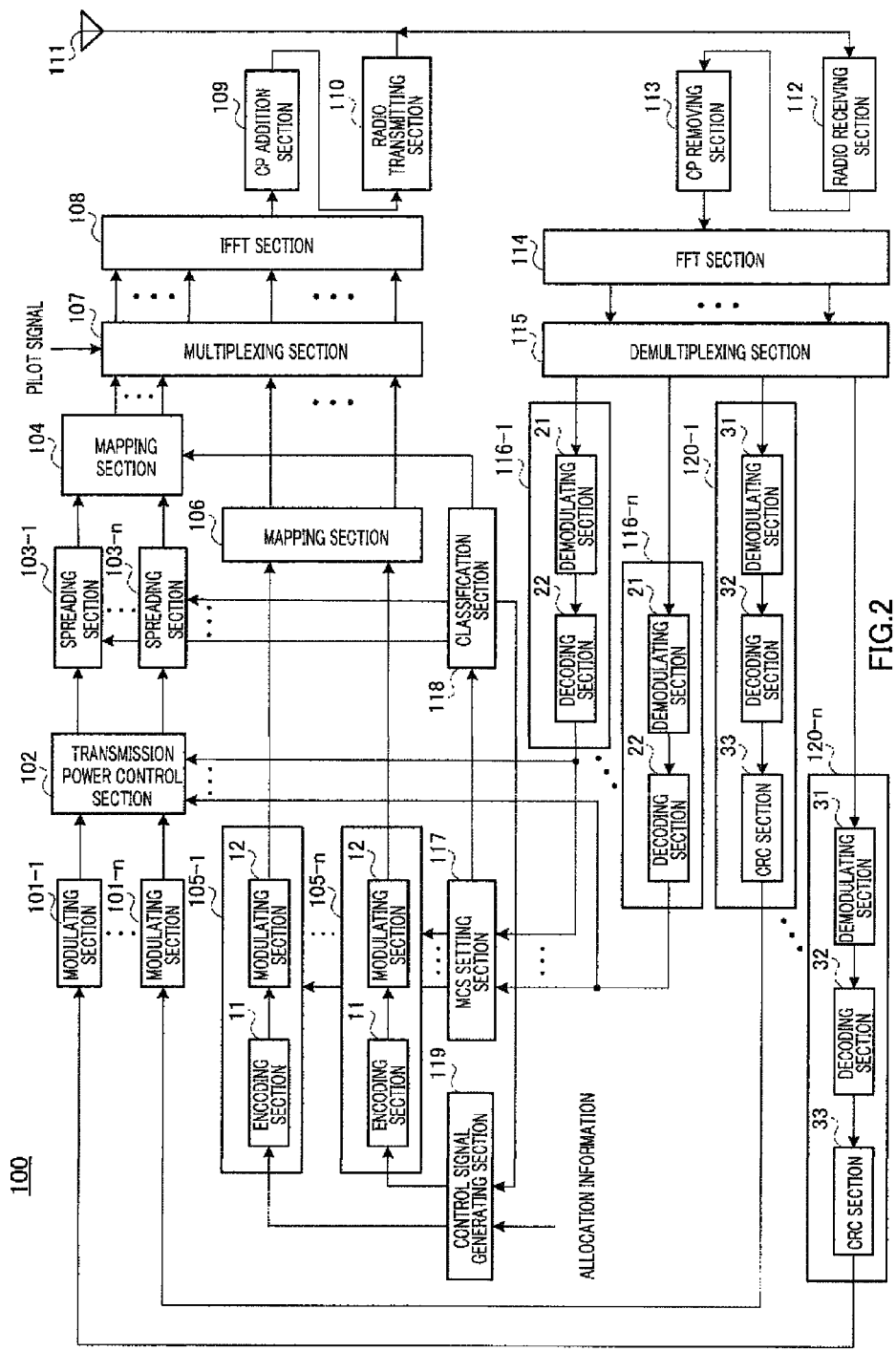
FIG. 2 is a block diagram showing the configuration of the base station according to Embodiment 1.

FIG. 2 shows the configuration of base station 100 of the present embodiment. Base station 100 frequency-multiplexes and code-multiplexes a plurality of DPCCHs on a plurality of subcarriers forming an OFDM symbol of a multicarrier signal.

To avoid complicated explanation, FIG. 2 shows components closely relating to the present invention, and involving uplink data reception and downlink transmission of response signals to uplink data, and drawings and explanation of the components involving downlink data transmission are omitted in the present embodiment.

In base station 100, DPCCH modulating sections 101-1 to 101-$n$, DPCCH spreading sections 103-1 to 103-$n$, SCCH (Shared Control Channel) encoding and modulating sections 105-1 to 105-$n$ each formed with encoding section 11 and modulating section 12, DPCCH demodulating and decoding sections 116-1 to 116-$n$ each formed with demodulating section 21 and decoding section 22, and data channel demodulating and decoding sections 120-1 to 120-$n$ each formed with demodulating section 31, decoding section 32 and CRC (Cyclic Redundancy Check) section 33 are provided in the number of mobile stations n with which base station 100 can communicate.

Modulating sections 101-1 to 101-$n$ modulate response signals (ACK signals or NACK signals) per mobile station to be transmitted on the DPCCH of each mobile station, and output the modulated signals to transmission power control section 102.

Transmission power control section 102 controls the power to transmit response signals based on received quality information reported from the mobile stations, and outputs the response signals to spreading sections 103-1 to 103-$n$. At this time, based on the received quality information per mobile station, transmission power control section 102 controls the power to transmit response signals on a per DPCCH basis. Further, the power to transmit the DPCCH of each mobile station is set up such that mobile stations can receive response signals insufficient received quality to satisfy a required error rate. To be more specific, transmission power control section 102 increases transmission power when received quality is lower and decreases transmission power when received quality is higher. By this means, the DPCCHs for mobile stations near a cell boundary are controlled at high transmission power, and the DPCCHs for mobile stations near the center of a cell are controlled at low transmission power.

Spreading sections 103-1 to 103-$n$ spread response signals with spreading codes specified from classification section 118 and output the response signal after spreading to mapping section 104.

According to the classification result of DPCCHs in classification section 118, mapping section 104 maps the response signals after spreading to a plurality of subcarriers forming an OFDM symbol, and outputs the mapped response signals to multiplexing section 107. That is, mapping section 104 maps the DPCCH of each mobile station to a plurality of subcarriers forming an OFDM symbol. By this mapping processing in mapping section 104, a plurality of DPCCHs are frequency-multiplexed and code-multiplexed on a plurality of subcarriers. The mapping processing in mapping section 104 will be described later in detail.

In encoding and modulating sect ions 105-1 to 105-$n$, encoding sections 11 encode control signals for mobile stations to be transmitted on the SCCHs per mobile station, and modulating sections 12 modulate the control signals after encoding, and output modulated control signals to mapping section 106. The MCSs (Modulation and Coding Schemes) at this time are in accordance with MCSs set in MCS setting section 117.

Mapping section 106 maps the control signals for the mobile stations to a plurality of subcarriers forming an OFDM symbol, and outputs the mapped control signals to multiplexing section 107. That is, mapping section 106 maps the SCCHs for the mobile stations to a plurality of subcarriers forming an OFDM symbol. By this mapping processing in mapping section 106, a plurality of SCCHs are frequency-multiplexed over the same time.

Multiplexing section 107 time-multiplexes the response signals received as input from mapping section 104, the control signals received as input from mapping section 106 and pilot signals, and outputs time-multiplexed signals to IFFT (Inverse Fast Fourier Transform) section 108. Control signals are multiplexed, for example, every subframe, and multiplexed at the beginning of each subframe. The pilot signals are multiplexed at predetermined time intervals.

IFFT section 108 performs an IFFT on the response signals, the control signals or the pilot signals mapped to a plurality of subcarriers, to generate an OFDM symbol.

CP (Cyclic Prefix) addition section 109 attaches the same signal as the tail part of the OFDM symbol, to the beginning of that OFDM symbol, as a CP.

Radio transmitting section 110 performs transmission processing including D/A conversion, amplification and up-conversion, on the OFDM symbol with an attachment of a CP, and transmits the OFDM symbol with a CP from antenna 111 to the mobile stations.

On the other hand, radio receiving section 112 receives via antenna 110 maximum n OFDM symbols transmitted at the same time from a maximum of n mobile stations, and performs receiving processing including down-conversion and A/D conversion on these OFDM symbols.

CP removing section 113 removes the CPs from the OFDM symbols after receiving processing.

FFT (Fast Fourier Transform) section 114 performs an FFT on the OFDM symbols after the CP removal to obtain the mobile station-specific signals multiplexed in the frequency domain. The mobile stations transmit signals using different subcarriers. The mobile station-specific received signals are classified into the controls signals including received quality information reported from the mobile stations, and the uplink data from the mobile stations, and the control signals and the uplink data are time-multiplexed. Each mobile station is able to measure received quality using a pilot signal from, for example, the received SNR, received SIR, received SINR, received CINR, received power, interference power, bit error rate, throughput, MCS that achieves a predetermined error rate, and so on. In addition, received quality information may be referred to as "CQI (Channel Quality Indicator)" or "CSI (Channel State Information)," for example.

Demultiplexing section 115 demultiplexes the received signals into control signals and uplink data, and outputs the mobile station-specific control signals to the corresponding demodulating and decoding sections 116-1 to 116-$n$, and output the uplink data per mobile station to corresponding demodulating and decoding sections 120-1 to 120-$n$.

In demodulating and decoding sections 116-1 to 116-$n$, demodulating sections 21 demodulate the control signals after the FFT and, decoding sections 22 decode the control signals after demodulation, and output the control signals after decoding to transmission power control section 102 and MCS setting section 117.

In demodulating and decoding sections 120-1 to 120-$n$, demodulating sections 31 demodulate the uplink data after the FFT and, decoding sections 32 decode the uplink data after demodulation. Further, CRC sections 33 each perform a CRC for the uplink data after decoding, and output an ACK signal when there is no error on the uplink data and a NACK signal when there is an error on the uplink data, as response signals, to modulating sections 101-1 to 101-$n$.

Based on the received quality information reported from the mobile stations, MCS setting section 117 sets up MCSs in encoding and modulating sections 105-1 to 105-$n$. At this time, MCS setting section 117 sets up the MCSs of control signals for SCCHs based on the mobile-station specific received quality information. The MCSs for SCCHs of the mobile stations are set up such that mobile stations can receive the control signals in sufficient received quality in which the mobile stations can satisfy a required error rate. To be more specific, MCS setting section 117 makes lower the MCS level when received quality is lower, and makes higher the MCS level when received quality is higher. By this means, the MCS level for the SCCHs of mobile stations near a cell boundary is set low and the MCS level for the SCCHs of mobile stations near the center of a cell is set high. Further, MCS setting section 117 outputs the MCS setting result in encoding and modulating sections 105-1 to 105-$n$ to classification section 118.

As for the modulation schemes, the modulation level is higher (i.e. M-ary number increases) when the MCS level is higher, and, as for the coding rates, the coding rate is higher when the MCS level is higher. That is, the transmission rate (i.e. bit rate) increases when the MCS level is higher, and, meanwhile, error rate performances degrade.

According to the MCS setting result, classification section 118 classifies a plurality of DPCCHs into a plurality of groups according to magnitudes of transmission power, and output the classification result to mapping section 104. Further, classification section 118 assigns spreading codes to the DPCCHs according to the classification result, and specifies the spreading codes for spreading the response signals to spreading sections 103-1 to 103-$n$. Further, classification section 118 outputs spreading code information showing which spreading codes are assigned to DPCCHs of which mobile stations, to control signal generating section 119. The classification processing in classification section 118 will be described later in detail.

Control signal generating section 119 receives as input allocation information that specifies allocating subcarriers for uplink data of the mobile stations, to the mobile stations, besides the spreading code information. Control signal generating section 119 generates a control signal formed with spreading code information and allocation information for each mobile station, and outputs the generated control signal to corresponding encoding section 11.

Next, the classification processing in classification section 118 and the mapping processing in mapping section 104 will be explained in detail.

As described above, transmission power control section 102 controls the power to transmit the response signals based on the received quality information reported from the mobile stations. Meanwhile, MCS setting section sets up MCSs in encoding and modulating sections 105-1 to 105-$n$ based on the received quality information reported from the mobile stations. Consequently, the transmission power for the DPCCHs and the MCSs for the SCCHs are set up based on the same received quality.

Further, as described above, the transmission power for a DPCCH increases when received quality is lower and decreases when received quality is higher. Meanwhile, the MCS level of a SCCH becomes lower when received quality is lower and becomes higher when received quality is higher.

Consequently, there are correspondence relationships between the transmission power for a DPCCH and the MCS level for a SCCH. That is, the transmission power for a DPCCH increases when the MCS level for a SCCH becomes lower and the transmission power for a DPCCH decreases when the MCS level for a SCCH becomes higher.

Consequently, by classifying a plurality of DPCCHs into a plurality of groups based on the MCSs for a plurality of SCCHs, classification section 118 can group a plurality of DPCCHs into a plurality of groups according to the magnitudes of the transmission power.

Figures 3, 4:
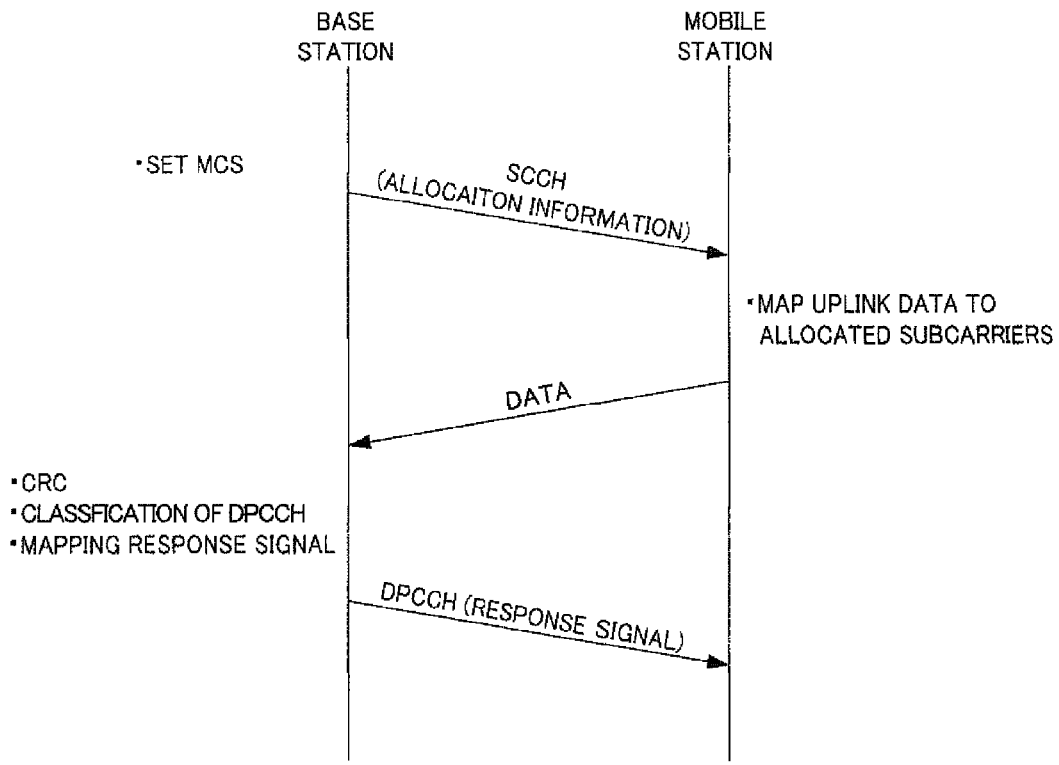
FIG. 3 is a sequence diagram according to Embodiment 1.
FIG. 4 is a MCS table according to Embodiment 1.

Further, as shown in FIG. 3, the base station first sets up the MCS for the SCCH in each subframe, and transmits the SCCH including allocation information to each mobile station. Next, according to the allocation information, a mobile station maps uplink data to allocated subcarriers and transmits data to the base station on the data channel. Next, the base station performs a CRC for the uplink data and feeds back a response signal to each mobile station on the DPCCH. In this way, in each subframe, a SCCH is transmitted to the same mobile station as a transmission destination of a DPCCH before the DPCCH is transmitted.

Consequently, classification section 118 can classify a plurality of DPCCHs into a plurality of groups based on the MCSs for a plurality of SCCHs.

Now, a specific explanation will be given below. In the following explanation, the MCSs that can be set in MCS setting section 117 are four MCSs, that is, MCS 1 to MCS 4 shown in the table in FIG. 4. Further, the mobile stations to which the SCCH is assigned are mobile stations 1 to 4 (MS 1 to MS 4). Further, the mobile stations near the center of a cell amongst mobile stations 1 to 4 are mobile stations 1 and 2, and the mobile stations near a cell boundary are mobile stations 3 and 4. Further, by MCS setting section 117, MCS 4 is set for the SCCH for mobile station 1 and the SCCH for mobile station 2 and MCS 2 is set for the SCCH for mobile station 3 and the SCCH for mobile station 4. Further, a threshold value of MCS levels is MCS 3.

Classification section 118 compares the MCSs for the SCCHs and the threshold value (MCS 3), and, according to the comparison results, classifies the DPCCHs for the mobile stations into a plurality of groups, that is, into a first group, to which the DPCCHs of the high transmission power belong, and a second group, to which the DPCCHs of the low transmission power belong. Classification section 118 classifies the DPCCHs (DPCCH 3 and DPCCH 4) for mobile stations 3 and 4, which are the transmission destinations of the SCCHs where MCSs less than the threshold value are set, into the first group, and classifies the DPCCHs (DPCCH 1 and DPCCH 2) for mobile stations 1 and 2, which are the transmission destinations of the SCCHs where MCSs equal to or more than the threshold value are set, into the second group.

Further, classification section 118 assigns unique spreading codes to DPCCH 3 and DPCCH 4 belonging to the first group and assigns unique spreading codes to DPCCH 1 and DPCCH 2 belonging to the second group. For example, classification section 118 assigns spreading code 1 to DPCCH 3, spreading code 2 to DPCCH 4, spreading code 1 to DPCCH 1 and spreading code 2 to DPCCH 2.

Then, according to the classification result in classification section 118, mapping section 104 maps the DPCCHs belonging to the same group to the same subcarriers and the DPCCHs belonging to different groups to different subcarriers. Mapping examples in mapping section 104 will be shown in the following.

Mapping Example 1

FIG. 5

Figure 5:
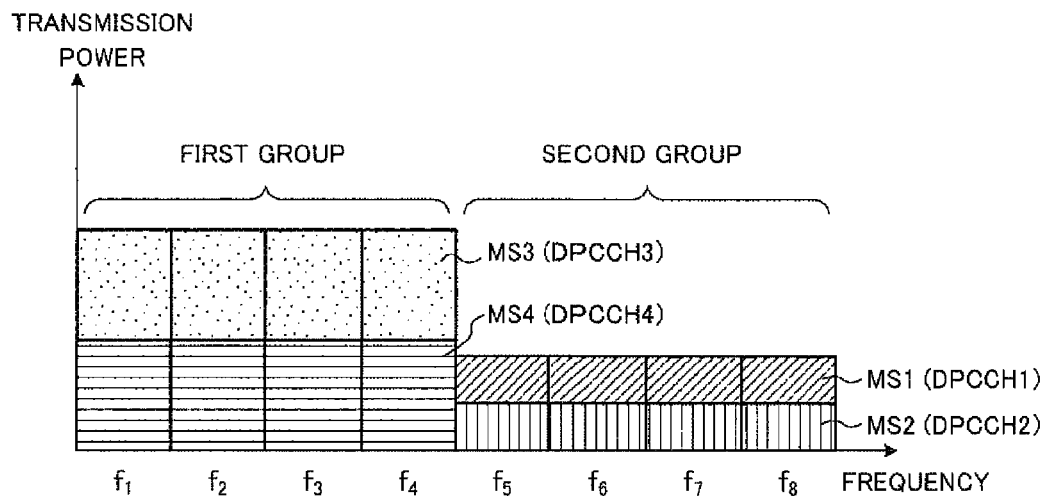
FIG. 5 is a mapping example of DPCCHs according to Embodiment 1 (example 1)

In the present mapping example, as shown in FIG. 5, mapping section 104 maps DPCCH 3 and DPCCH 4 belonging to the first group to subcarriers $f_1$ to $f_4$, and maps DPCCH 1 and DPCCH 2 belonging to the second group to subcarriers $f_5$ to $f_8$. That is, mapping section 104 maps the response signal for mobile station 3 and the response signal for mobile station 4 to subcarriers $f_1$ to $f_4$ and code-multiplexes the mapped response signals, and maps the response signal to mobile station 1 and the response signal to mobile station 2 to subcarriers $f_5$ to $f_8$ and code-multiplexes the mapped response signals.

By this mapping, response signals with high transmission power are code-multiplexed on the same frequency resources (i.e. subcarriers $f_1$ to $f_4$) and response signals with low transmission power are code-multiplexed on the same frequency resources (subcarriers $f_5$ to $f_8$). Further, response signals with high transmission power and response signals with low transmission power are code-multiplexed on different frequency resources. By this means, with the present mapping example, it is possible to decrease the difference of transmission power between DPCCHs code-multiplexed on the same frequency resources.

As described above, the degree of degradation of error rate performances in each DPCCH due to occurrence of inter-code interference depends on relative relationships between magnitudes of transmission power of DPCCHs. Consequently, according to the present mapping example, it is possible to suppress the influence of inter-code interference of DPCCHs with low transmission power from DPCCHs with high transmission power, and suppress the degradation of error rate performances of DPCCHs with low transmission power, that is, suppress the degradation of error rate performances of response signals for mobile stations near the center of a cell.

Mapping Example 2

FIG. 6

Figure 6:
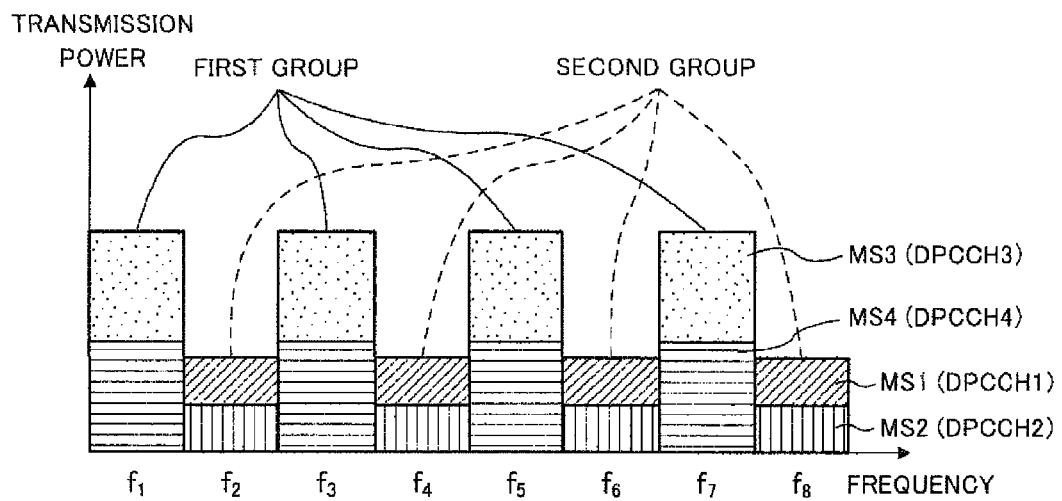
FIG. 6 is a mapping example of DPCCHs according to Embodiment 1 (example 2)

In mapping example 1, the DPCCHs belonging to the first group are mapped to subcarriers $f_1$ to $f_4$ collectively and the DPCCHs belonging to the second group are mapped to subcarriers $f_5$ to $f_8$ collectively. However, the present mapping example is different from mapping example 1 in mapping the DPCCHs belonging to the first and second groups on frequency resources in a distributed manner. To be more specific, as shown in FIG. 6, mapping section 104 maps DPCCH 3 and DPCCH 4 belonging to the first group to subcarriers $f_1$, $f_3$, $f_5$ and $f_7$ in a distributed manner and maps DPCCH 1 and DPCCH 2 belonging to the second group to subcarriers $f_2$, $f_4$, $f_6$ and $f_8$ in a distributed manner.

Consequently, according to the present mapping example, it is possible to provide greater frequency diversity effect than in mapping example 1.

Mapping Example 3

FIG. 7

In mapping example 1, the spreading factor (SF) of the DPCCHs belonging to the first group and the spreading factor of the DPCCHs belonging to the second group are the same. However, the present mapping example is different from mapping example 1 in that the spreading factors vary. To be more specific, classification section 118 assigns the spreading code of SF=6 for DPCCH 3 and DPCCH 4 belonging to the first group and provides the spreading code of SF=2 for DPCCH 1 and DPCCH 2 belonging to the second group. That is, the present mapping example is different from mapping example 1 in spreading the DPCCHs of higher transmission power with the spreading code of a higher spreading factor.

Figure 7:
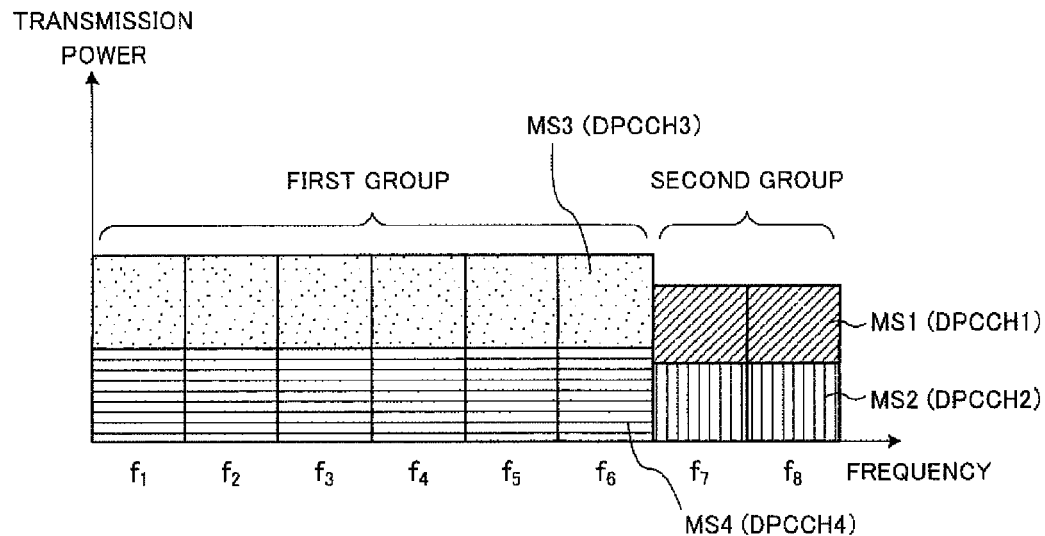
FIG. 7 is a mapping example of DPCCHs according to Embodiment 1 (example 3)

Then, referring to FIG. 7, mapping section 104 maps DPCCH 3 and DPCCH 4 belonging to the first group to subcarriers $f_1$ to $f_6$, and maps DPCCH 1 and DPCCH 2 belonging to the second group to subcarriers $f_7$ and $f_8$. That is, mapping section 104 maps dedicated control channels belonging to the group of higher transmission power to a larger number of subcarriers.

By this means, it is possible to increase frequency diversity effect for the DPCCHs for mobile stations which are near a cell boundary and which are susceptible to the influence of interference from neighboring cells. Further, according to the present mapping example, as shown in FIG. 7, the difference between transmission power in subcarriers is made smaller than in FIG. 5 and interference power to the neighboring cells is made uniform, so that it is possible to suppress the degradation of error rate performances in neighboring cells due to the influence of interference power.

Mapping Example 4

FIG. 8

Figure 8:
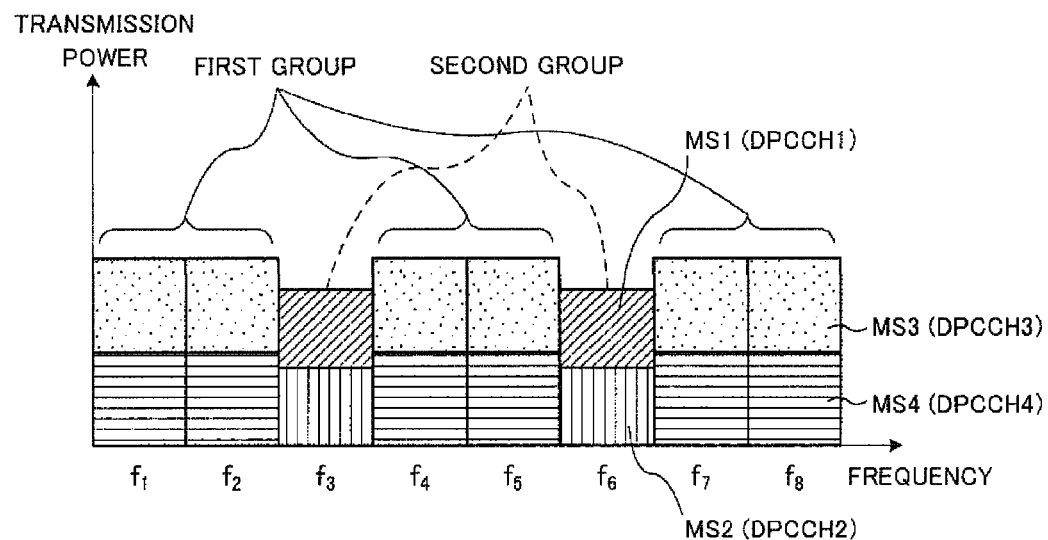
FIG. 8 is a mapping example of DPCCHs according to Embodiment 1 (example 4)

Referring to FIG. 8, the present mapping example combines mapping example 2 and mapping example 3. Consequently, according to the present mapping example, it is possible to acquire the effect of mapping example 2 and the effect of mapping example 3 at the same time.

Mapping examples 1 to 4 have been explained.

Here, with the present embodiment, the mobile stations share the same threshold value as the threshold in classification section 118 in base station 100. That is, the threshold value of MCS levels in the mobile stations is MCS 3. In this way, by using the same threshold value between base station 100 and the mobile stations, each mobile station can specify the subcarriers to which the DPCCH for the mobile station is mapped, from the comparison result between the MCSs for SCCHs and the threshold value. For example, in the case where the DPCCHs are mapped as in mapping example 1 (FIG. 5), mobile station 1 (MS 1) compares MCS 4, which is the MCS for the SCCH for mobile station 1, and MCS 3 of the threshold value and can determine that the DPCCH for mobile station 1 (i.e. DPCCH 1) is mapped to subcarriers $f_5$ to $f_8$ because the MCS for the SCCH is equal to and more than the threshold value. Consequently, with the present embodiment, base station 100 does not need to report information showing a classification result in classification section 118 and mapping result information showing to which subcarriers which DPCCHs for the mobile stations are mapped.

Further, the mobile stations perform blind detection of the MCSs for SCCHs. For example, each mobile station demodulates and decodes the SCCH with all the MCSs, from MCS 1 to MCS 4, and determines the MCS without an error on the decoded result as the MCS for the SCCH. Further, each mobile station despreads a response signal according to spreading code information.

In this way, according to the present embodiment, a response signal with low transmission power for a mobile station near the center of a cell and a response signal with high transmission power for a mobile station near a cell boundary are mapped to different frequency resources, so that, when a plurality of response signals for which transmission power is controlled are frequency-multiplexed and code-multiplexed, it is possible to suppress the degradation of error rate performances of the response signals for the mobile stations near the center of a cell.

Further, with the present embodiment, the threshold value of the MCS levels is the same between the base station and mobile stations, and therefore report information is no longer necessary for each mobile station to determine frequency resources to which a response signal for the mobile station is mapped (information showing classification result and mapping result information), so that it is possible to suppress error rate performances of response signals for mobile stations near the center of a cell without increasing overhead in downlink.

Embodiment 2

The present embodiment is different from Embodiment 1 in classifying a plurality of DPCCHs into groups such that the number of DPCCHs belonging to each group is equal. Now, the points that are only different from Embodiment 1 will be explained.

For example, the mobile stations to which the SCCH is assigned are mobile station 1 to 6 (i.e. MS 1 to MS 6) and located in order from the center of a cell to a cell boundary, mobile station 2, mobile station 5, mobile station 6, mobile station 3, mobile station 1, and mobile station 4. Then, as shown in FIG. 9, by MCS setting section 117, MCS 4 is set for the SCCH for mobile station 2, the SCCH for mobile station 5 and the SCCH for mobile station 6, MCS 3 is set for the SCCH for mobile station 3, and MCS 2 is set for the SCCH for mobile station 1, and MCS 1 is set for the SCCH for mobile station 4.

Classification section 118 first arranges mobile station 1 to 6 in the order of the MCS levels for SCCHs. For example, if the mobile stations are arranged in order from the highest MCS level, the result is as shown in FIG. 10. Then, classification section 118 classifies DPCCH 1 to DPCCH 6 to be transmitted to mobile station 1 to 6, respectively, into a first group and a second group such that the number of DPCCHs belonging to the groups is equal. That is, according to the order of MCS levels for SCCHs, classification section 118 classifies three DPCCHs into the first group and the second group alike. As shown in FIG. 10, that results in classifying DPCCH 2, DPCCH 5, and DPCCH 6 into the first group and classifying DPCCH 3, DPCCH 1 and DPCCH 4 into the second group.

Then, classification section 118 sets up a MCS level on the border between the first group and the second group as a threshold value of the MCS levels. Therefore, MCS 4 is set for the threshold value here. Further, classification section 118 outputs threshold value information showing this threshold value to control signal generating section 119. Control signal generating section 119 generates a control signal formed with spreading code information, allocation information and threshold value information for each mobile station, and outputs the generated control signal to corresponding encoding section 11.

From the comparison result between the MCSs for SCCHs and the threshold value reported from the threshold value information each mobile station specifies the subcarriers to which the DPCCHs to the mobile station is mapped.

In this way, according to the present embodiment, a plurality of DPCCHs are classified into groups such that the number of DPCCHs belonging to each group is equal, so that, in addition to the effect of Embodiment 1, it is possible to prevent a large number of DPCCHs from being mapped not uniformly on part of frequency resources to be code-multiplexed while the increase of overhead in downlink suppresses at a minimum. Consequently, according to the present embodiment, it is possible to use frequency resources uniformly for code-multiplexing DPCCHs.

Embodiment 3

The present embodiment is different from Embodiments 1 and 2 in assigning a plurality of SCCHs to a plurality of mobile stations based on the classification result of DPCCHs. Now, only the different points from Embodiments 1 and 2 will be explained.

The operations until classification section 118 classifies DPCCH 2, DPCCH 5, and DPCCH 6 into the first group and classifies DPCCH 3, DPCCH 1 and DPCCH 4 into the second group are the same as in Embodiment 2, and therefore the explanation will be omitted. In the present embodiment, setting of the threshold value in Embodiment 2 is not required.

Classification section 118 outputs the classification result to mapping section 104 and mapping section 106.

Mapping section 106 has a table in which associations between a plurality of groups and a plurality of SCCHs are provided as shown in FIG. 11. Here, SCCH 1 to SCCH 3 are associated with the second group and SCCH 4 to SCCH 6 are associated with the first group. Mapping section 106 assigns SCCH 1 to SCCH 6 to mobile station 1 to mobile station 6 with reference to this table according to the classification result for the DPCCHs in classification section 118. In classification section 118, as shown in FIG. 10, mobile station 3, mobile station 1 and mobile station 4 are classified into the first group and mobile station 2, mobile station 5 and mobile station 6 are classified into a second group, so that, in the second group, mapping section 106 assigns SCCH 1 to mobile station 2, SCCH 2 to mobile station 5, SCCH 3 to mobile station 6, and in the first group, mapping section 106 assigns SCCH 4 to mobile station 3, SCCH 5 to mobile station 1 and SCCH 6 to mobile station 4. According to these assignments, mapping section 106 maps the control signals for the mobile stations to the subcarriers corresponding to the SCCHs.

Each mobile station performs blind detection of SCCH numbers and specifies the SCCH number assigned to the mobile station, and, from the specified SCCH number, the mobile station specifies the subcarriers to which the DPCCH for the mobile station is mapped. For example, by dividing frequency resources formed with a plurality of subcarriers into several areas, and by associating the areas and the SCCH numbers in advance to set up a plurality of SCCHs, so that blind detection of the SCCH numbers is possible.

In this way, according to the present embodiment, a plurality of SCCHs are assigned to a plurality of mobile stations based on a classification result of DPCCHs, so that, it eliminates the need for reporting threshold value information for the mobile stations even when a plurality of DPCCHs are classified into groups such that the number of DPCCHs belonging to each group is equal as in Embodiment 2. Consequently, according to the present embodiment, in addition to the effect of Embodiment 1, it is possible to provide an advantage of Embodiment 2 without increasing overhead in downlink.

Embodiment 4

The present embodiment is different from Embodiment 1 in that, a SCCH occupies one or a plurality of CCEs (Control Channel Elements) and a plurality of DPCCHs are classified into a plurality of groups based on aggregation sizes of the CCEs. Now, only the different points from Embodiment 1 will be explained.

Figure 12:
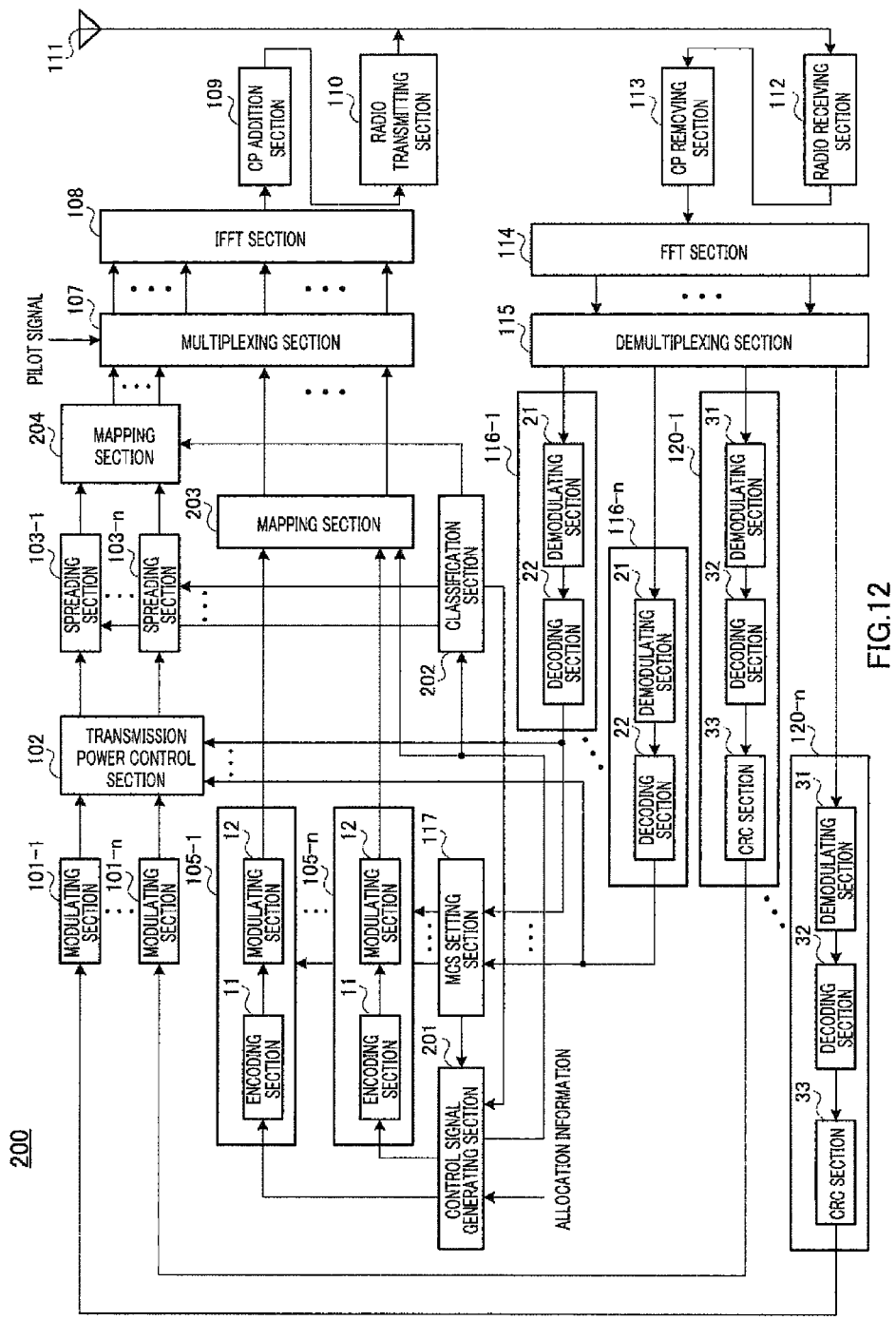
FIG. 12 is a block diagram showing the configuration of the base station according to Embodiment 4.

FIG. 12 shows the configuration of base station 200 according to the present embodiment. In FIG. 12, the same components as in FIG. 2 (Embodiment 1) will be assigned the same reference numerals and overlapping descriptions will be omitted.

Control signal generating section 201 receives as input allocation information that specifies allocating subcarriers for uplink data of the mobile stations, to the mobile stations, besides the spreading code information. Control signal generating section 201 generates a control signal formed with spreading code information and allocation information for each mobile station, and outputs the generated control signal to corresponding encoding section 11.

Control signal generating section 201 receives the MCS setting result in encoding and modulating sections 105-1 to 105-n from MCS setting section 117.

Here, each SCCH occupies one or a plurality of CCEs according to the MCSs in encoding and modulating sections 105-1 to 105-n. For example, if the SCCH for reporting control information of coding rate ⅔ occupies one CCE, the SCCH for reporting control information of coding rate ⅓ occupies two CCEs, and the SCCH for reporting control information of coding rate ⅙ occupies four CCEs. Further, in the case where a SCCH occupies a plurality of CCEs, the SCCH occupies a plurality of consecutive CCEs. For example, in the communication system where CCE #1 to CCE #8 are defined, in the case where one SCCH occupies four CCEs, the SCCH occupies four CCEs, CCE #1 to CCE #4 or CCE #5 to CCE #8 as shown in FIG. 13A. That is, in the case of FIG. 13A, four CCEs aggregate, and therefore the aggregation size is four CCEs. Further, for example, in the case where one SCCH occupies two CCEs, the SCCH occupies two CCEs, CCEs #1 and #2, CCEs #3 and #4, CCEs #5 and #6 or CCEs #7 and #8 as shown in FIG. 13B. That is, in the case of FIG. 13B, two CCEs aggregate, and therefore the aggregation size is two CCEs. Further, for example, in the case where one SCCH occupies one CCE, the SCCH occupies one CCE, CCE #1, CCE #2, CCE #3, CCE #4, CCE #5, CCE #6, CCE #7 or #8 as shown in FIG. 13C. That is, in the case of FIG. 13C, the aggregation size is one CCE.

Further, in one subframe, one CCE is not occupied redundantly by a plurality of SCCHs. For example, in the case where one SCCH occupies the aggregate area with four CCEs, CCE #1 to CCE #4, another SCCH does not occupy the aggregate area with two CCEs, that is, CCE #1 and CCE #2, the aggregate area with two CCEs, that is, CCE #3 and CCE #4, and, the aggregate area with one CCE, that is, CCE #1, CCE #2, CCE #3, and CCE #4. Similarly, in the case where one SCCH occupies the aggregate area with four CCEs, CCE #5 to CCE #8, another SCCH does not occupy the aggregate area with two CCEs, that is, CCE #5 and CCE #6, the aggregate area with two CCEs, that is, CCE #7 and CCE #8, and, the aggregate area with one CCE, that is, CCE #5, CCE #6, CCE #7, and CCE #8. That is, in one subframe, a plurality of SCCHs are not multiplexed on the same CCE.

Then, according to the MCSs in encoding and modulating sections 105-1 to 105-n, control signal generation section 201 assigns SCCHs to the mobile stations according to the number of CCEs needed to report control information (the number of CCEs occupied), and outputs the CCE numbers corresponding to the assigned SCCHs to mapping section 203. Further, according to the MCSs in encoding and modulating sections 105-1 to 105-n, control signal generation section 201 determines aggregation sizes per SCCH, and outputs the determined aggregation sizes to classification section 202.

According to the aggregation sizes determined in control signal generating section 201, classification section 202 classifies a plurality of DPCCHs into a plurality of groups according to magnitudes of transmission power, and outputs the classification result to mapping section 204. Further, classification section 202 assigns spreading codes to the DPCCHs according to the classification result, and specifies the spreading codes for spreading the response signals to spreading sections 103-1 to 103-n. Further, classification section 202 outputs spreading code information showing which spreading codes are assigned to DPCCHs of which mobile stations, to control signal generating section 201. The classification processing in classification section 202 will be described later in detail.

According to the CCE numbers received as input from control signal generation section 201, mapping section 203 maps the control signals to the mobile stations to a plurality of subcarriers forming an OFDM symbol, and outputs the mapped control signals to multiplexing section 107. That is, mapping section 203 maps a plurality of SCCHs of the mobile stations to the subcarriers corresponding to the CCE numbers in a plurality of subcarriers forming an OFDM symbol. Here, CCEs #1 to #8 correspond to subcarriers $f_1$ to $f_8$, respectively.

According to the classification result of the DPCCHs in classification section 202, mapping section 204 maps the response signals after spreading to a plurality of subcarriers forming an OFDM symbol, and outputs the mapped response signals to multiplexing section 107. That is, mapping section 204 maps the DPCCH of each mobile station to one of a plurality of subcarriers forming an OFDM symbol. By this mapping processing in mapping section 204, a plurality of DPCCHs are frequency-multiplexed and code-multiplexed on a plurality of subcarriers. The mapping processing in mapping section 204 will be described later in detail.

Next, the classification processing in classification section 202 and mapping processing in mapping section 204 will be described later in detail.

In the following explanation, to use downlink communication resources efficiently by eliminating signaling to report DPCCHs used to transmit response signals from the base station to the mobile stations, CCEs and DPCCHs are associated one to one. That is, CCE #1 to CCE #8 correspond to DPCCH 1 to DPCCH 8.

Further, in the case where a SCCH occupies a plurality of CCEs, that is, where the aggregation size is four CCEs (FIG. 13A) or two CCEs (FIG. 13B), a response signal is transmitted using the DPCCH corresponding to the CCE having the smallest number among a plurality of aggregate CCEs. That is, for example, in the case where four CCEs are aggregate as shown in FIG. 13A (i.e. the aggregation size is four CCEs), a response signal is transmitted using DPCCH 1 or DPCCH 5, as shown in FIG. 14. Further, for example, in the case where two CCEs are aggregate as shown in FIG. 13B (i.e. the aggregation size is two CCEs), a response signal is transmitted using DPCCH 1, DPCCH 3, DPCCH 5 or DPCCH 7, as shown in FIG. 14. Further, for example, in the case where one CCE is aggregate as shown in FIG. 13C (i.e. the aggregation size is one CCE), a response signal is transmitted using one of DPCCH 1 to DPCCH 8, as shown in FIG. 14.

As described above, transmission power control section 102 controls the power to transmit the response signals based on the received quality information reported from the mobile stations. Meanwhile, MCS setting section 117 sets up MCSs in encoding and modulating sections 105-1 to 105-n based on the received quality information reported from the mobile stations. Further, the aggregation sizes of CCEs are determined according to MCSs in encoding and modulating sections 105-1 to 105-n. Consequently, the transmission power for the DPCCHs and the aggregation sizes of CCEs are set based on the same received quality.

Further, as described above, the transmission power for a DPCCH increases when received quality is lower and decreases when received quality is higher. Meanwhile, the MCS level of a SCCH becomes lower when received quality is lower and becomes higher when received quality is higher.

Further, the aggregation size increases when the MCS level is lower and decreases when the MCS level is higher.

Consequently, there are correspondence relationships between the transmission power for a DPCCH and the aggregation size of CCEs in a SCCH. That is, the transmission power for a DPCCH increases when the aggregation size of CCEs in a SCCH increases and the transmission power for a DPCCH decreases when the aggregation size of CCEs in a SCCH decreases.

Consequently, by grouping a plurality of DPCCHs into a plurality of groups based on the aggregation size of CCEs in a plurality of SCCHs, classification section 202 can group a plurality of DPCCHs into a plurality of groups according to the magnitudes of the transmission power.

Now, a specific explanation will be given below. In the following explanation, the mobile stations to which the SCCH is assigned are mobile stations 1 to 3 (MS 1 to MS 3). Further, the mobile stations near the center of a cell amongst mobile stations 1 to 3 are mobile stations 1 and 2, and the mobile station near a cell boundary are mobile stations 3. Further, mobile station 1 is located closer to base station 200 than mobile station 2. Further, by control signal generating section 201, the aggregation size of one CCE is set for the SCCH for mobile station 1, the aggregation size of two CCEs is set for the SCCH for mobile station 2, and the aggregation size of four CCEs is set for the SCCH for mobile station 3. That is, the response signal to mobile station 1 is transmitted using one of DPCCH 1 to DPCCH 8, the response signal to mobile station 2 is transmitted using either DPCCH 1, DPCCH 3, DPCCH 5 or DPCCH 7, and the response signal to mobile station 3 is transmitted using either DPCCH 1 or DPCCH 5. The threshold value of the aggregation sizes is four CCEs, as shown in FIG. 14. Further, the mobile stations share the same threshold value as the threshold value (FIG. 14) in classification section 202 in base station 200.

Figure 15:
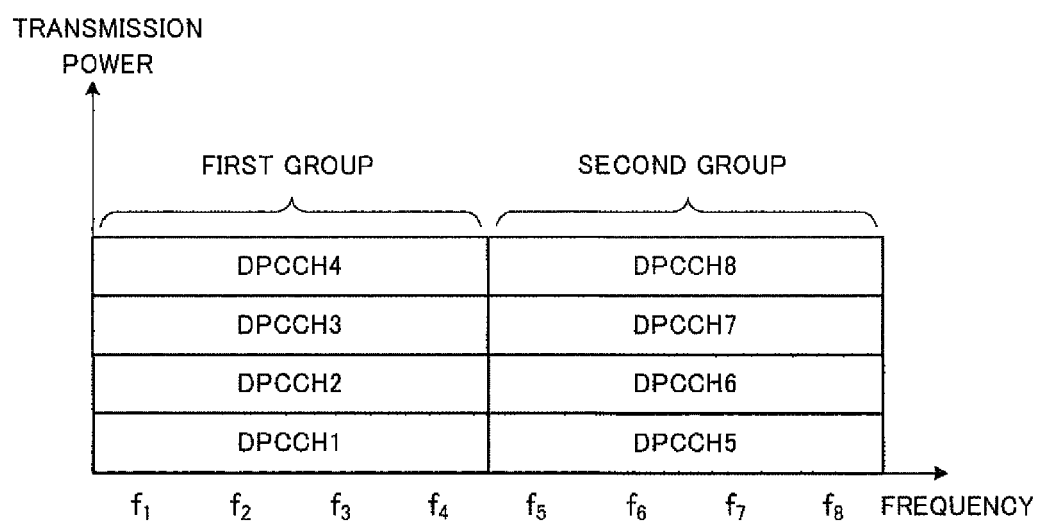
FIG. 15 illustrates the associations between DPCCHs and groups (example 1), according to Embodiment 4.

Here, with the present embodiment, grouping in classification section 202 is carried out according to associations between DPCCHs and groups as shown in FIG. 15. In FIG. 15, DPCCH 1 to DPCCH 4 form a first group and are code-multiplexed on the same frequency band of subcarriers $f_1$ to $f_4$, and DPCCH 5 to DPCCH 8 form the second group and are code-multiplexed on the same frequency band of subcarriers $f_5$ to $f_8$.

Therefore, according to the aggregation size determined in control signal generating section 201, classification section 202 can classify the DPCCHs for the mobile stations into a plurality of groups, that is, into a group, to which the DPCCHs with the higher transmission power belong, and a group, to which the DPCCHs with the lower transmission power belong.

Further, classification section 202 assigns unique spreading codes to DPCCH 1 to DPCCH 4 belonging to the first group and assigns unique spreading codes to DPCCH 5 to DPCCH 8 belonging to the second group.

Then, according to the classification result in classification section 202, mapping section 204 maps the DPCCHs belonging to the same group to the same subcarriers and the DPCCHs belonging to different groups to different subcarriers.

Figure 16:
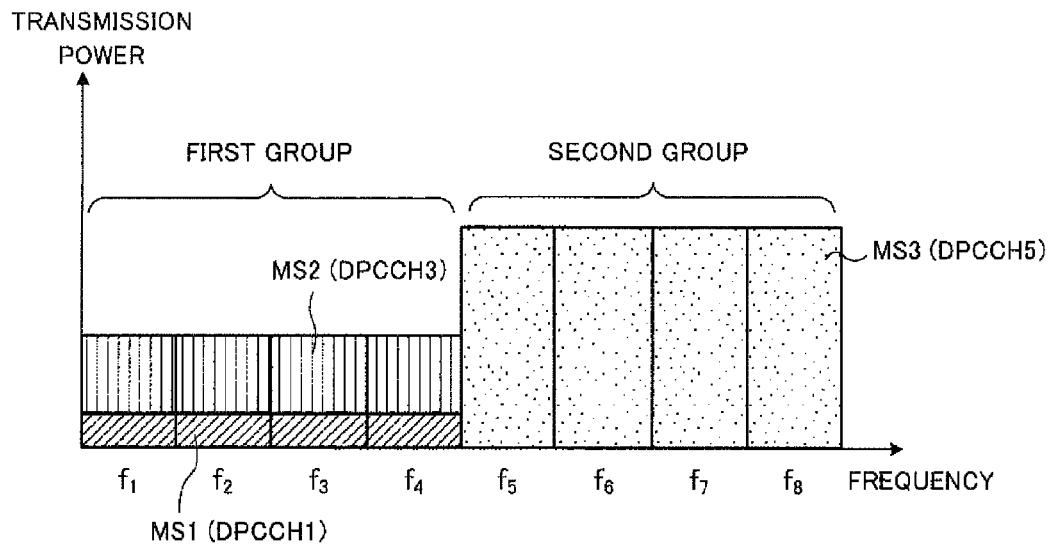
FIG. 16 is the mapping example of DPCCHs (example 1), according to Embodiment 4.

To be more specific, for example, when the DPCCH, which has an aggregation size of four CCEs and which is for mobile station 3, is DPCCH 5, the DPCCH, which has an aggregation size of two CCEs and which is for mobile station 2, is DPCCH 3, and the DPCCH, which has an aggregation size of one CCE and which is for mobile station 1, is DPCCH 1, the DPCCHs are mapped as shown in FIG. 16.

Figure 17:
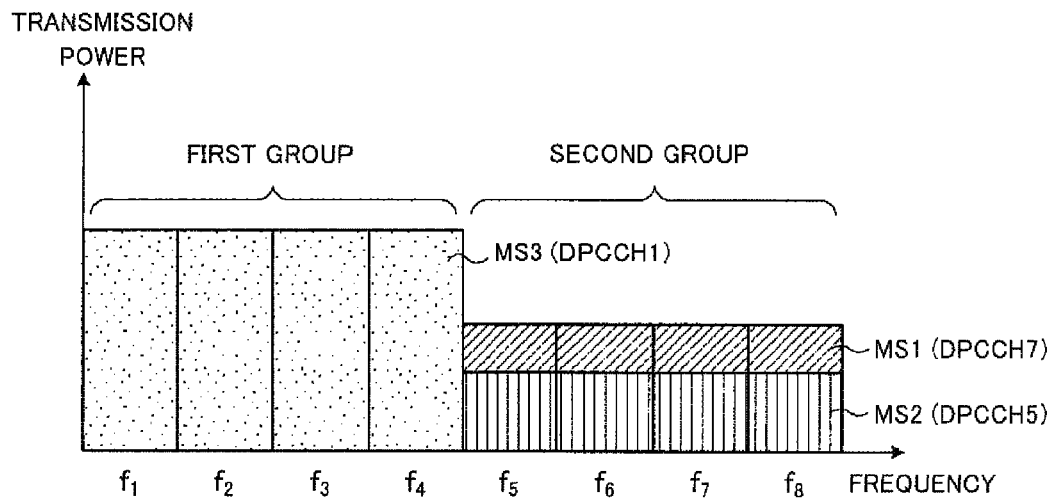
FIG. 17 is the mapping example of DPCCHs (example 2), according to Embodiment 4.

Further, for example, when the DPCCH, which has an aggregation size of four CCEs and which is for mobile station 3, is DPCCH 1, the DPCCH, which has an aggregation size of two CCEs and which is for mobile station 2, is DPCCH 5, and the DPCCH, which has an aggregation size of one CCE and which is for mobile station 1, is DPCCH 7, the DPCCHs are mapped as shown in FIG. 17.

That is, the DPCCH (DPCCH with high transmission power), which is for mobile station 3 having a threshold aggregation size or greater (i.e. DPCCH of the larger aggregation size) and the DPCCH (DPCCH with low transmission power), which is for mobile stations 1 and 2 having under a threshold aggregation size (i.e. DPCCH of the smaller aggregation size) are code-multiplexed on different frequency resources.

Consequently, by these mappings, response signals with high transmission power are code-multiplexed on the same frequency resources, and response signals with low transmission power are code-multiplexed on the same frequency resources. Further, response signals with high transmission power and response signals with low transmission power are code-multiplexed on different frequency resources. By this means, with the present embodiment, it is possible to decrease the difference of transmission power between DPCCHs code-multiplexed on the same frequency resources.

As described above, the degree of degradation of error rate performances in each DPCCH due to occurrence of inter-code interference depends on relative relationships between magnitudes of the transmission power of DPCCHs. Consequently, according to the present embodiment, it is possible to suppress the influence of inter-code interference of DPCCHs with low transmission power from DPCCHs with high transmission power, and suppress the degradation of error rate performances of DPCCHs with low transmission power, that is, suppress the degradation of error rate performances of response signals for mobile stations near the center of a cell.

Figure 18:
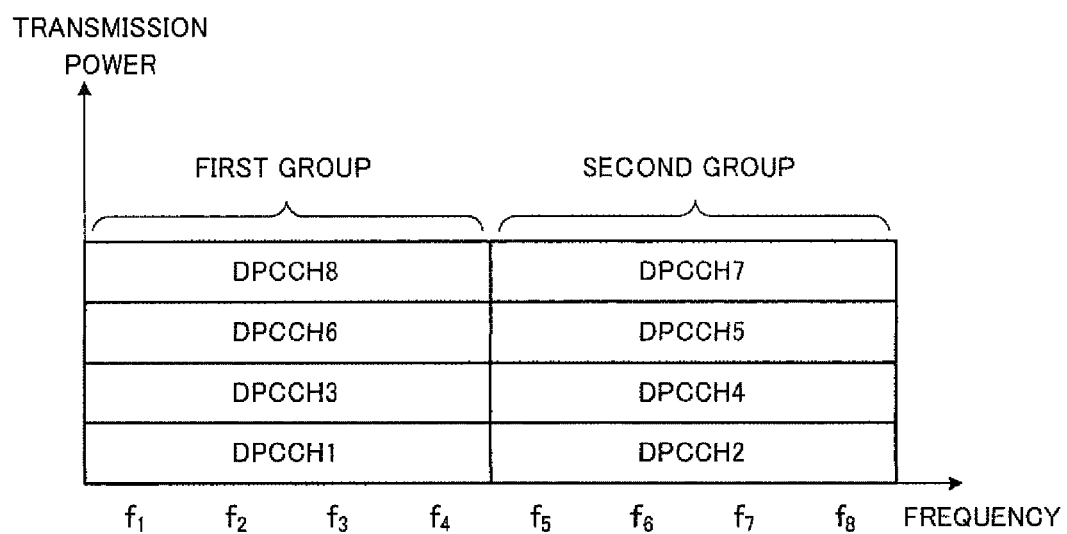
FIG. 18 illustrates the associations between DPCCHs and groups (example 2), according to Embodiment 4.

The grouping in classification section 202 may be carried out according to associations between the DPCCHs and the groups as shown in FIG. 18. Similar to the above, even when these associations are used, it is possible to code-multiplex the DPCCH (DPCCH with high transmission power), which is for mobile station 3 having a threshold aggregation size or greater (i.e. DPCCH of the larger aggregation size) and the DPCCH (DPCCH with low transmission power), which is for mobile stations 1 and 2 having under a threshold aggregation size (i.e. DPCCH of the smaller aggregation size) on different frequency resources.

Embodiment 5

The present embodiment is different from Embodiment 4 in using IQ multiplexing in addition to code multiplexing as multiplexing method of DPCCHs. Now, only the different points from Embodiment 4 will be explained.

Here, in IQ multiplexing of response signals, two response signals to two mobile stations one bit each, are subject to BPSK modulation and two BPSK symbols are generated, and those two BPSK symbols are separated to I-channels and Q-channels and each multiplexed. For example, a response signal to mobile station 1 is multiplexed on I-channels and a response signal to mobile station 2 to Q-channels. By this means, it is possible to increase the number of transmission bits per symbol. Meanwhile, in a communication environment such that the accuracy of channel estimation in mobile stations is degraded, when the difference of transmission power between I-channel and Q-channel is great, performances are degraded due to occurrence of interference between I-channel and Q-channel. That is, similar to the case of occurrence of inter-code interference as described above, the degree of degradation of error rate performances in each DPCCH due to occurrence of interference between I-channel and Q-channel, depends on relative relationships between magnitudes of the transmission power of DPCCHs.

Figure 19:
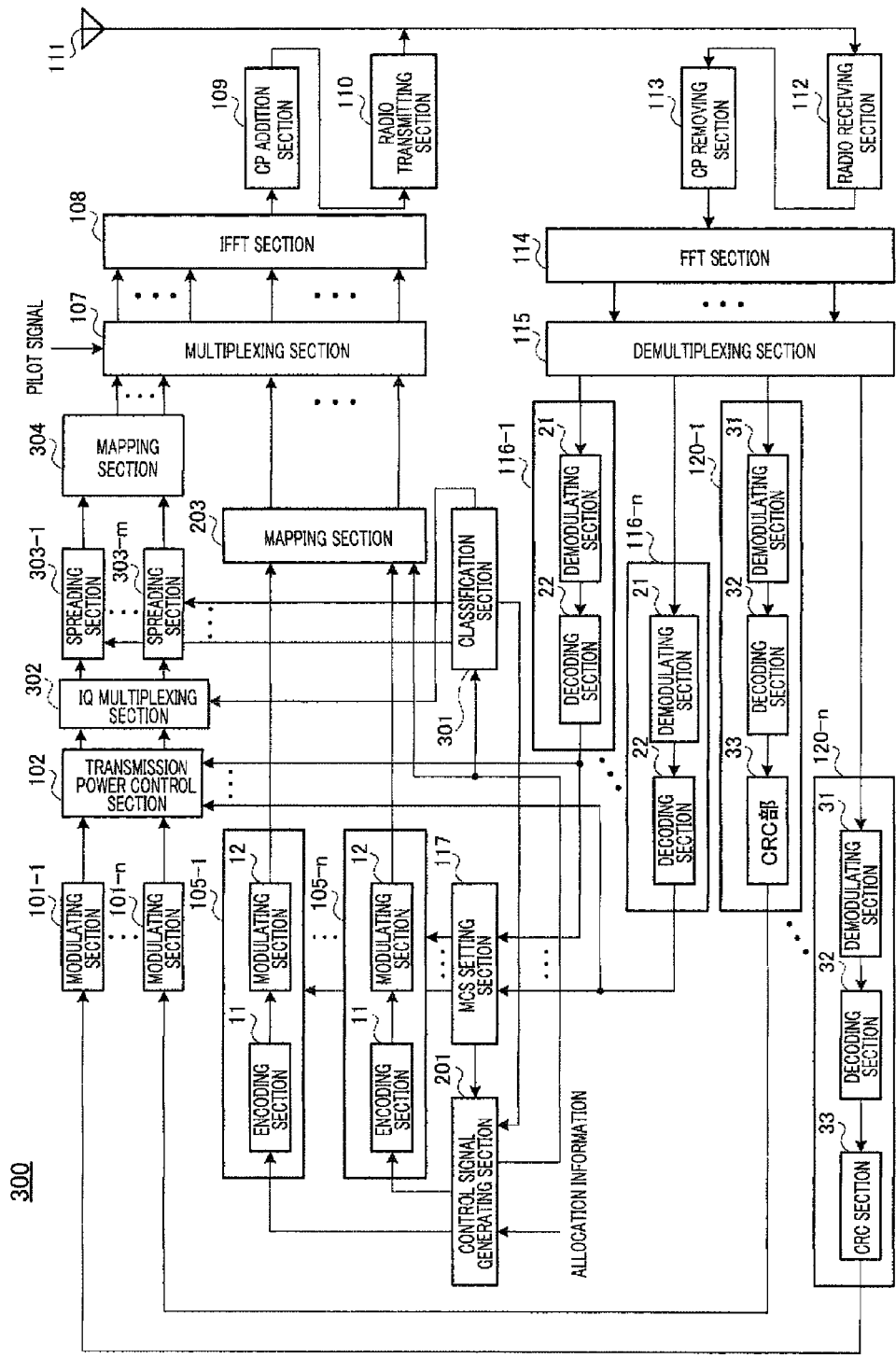
FIG. 19 is a block diagram showing the configuration of the base station according to Embodiment 5.

FIG. 19 shows the configuration of base station 300 according to the present embodiment. In FIG. 19, the same components as in FIG. 2 (Embodiment 1) and FIG. 12 (Embodiment 4) will be assigned the same reference numerals and overlapping descriptions will be omitted.

Modulating sections 101-1 to 101-$n$ BPSK-modulate response signals per mobile station to be transmitted on the DPCCH of each mobile station, to generate BSPK symbols, and outputs the BPSK symbols to transmission power control section 102.

According to the aggregation sizes determined in control signal generating section 201, classification section 301 classifies a plurality of DPCCHs into a plurality of groups according to magnitudes of transmission power, and outputs the classification result to multiplexing section 302. Further, classification section 301 assigns spreading codes to the DPCCHs according to the classification result, and specifies the spreading codes for spreading the response signals to spreading sections 303-1 to 303-$m$. Further, classification section 301 outputs spreading code information showing which spreading codes are assigned to DPCCHs of which mobile stations, to control signal generating section 201. The classification processing in classification section 301 will be described later in detail.

According to the classification result of the DPCCHs in classification section 301, IQ multiplexing section 302 IQ-multiplexes the BPSK symbols, and outputs the multiplexed BPSK symbols to spreading sections 303-1 to 303-$m$. The IQ multiplexing in IQ multiplexing section 302 will be described later in detail.

Spreading sections 303-1 to 303-$m$ spread response signals after IQ multiplexing with spreading codes specified from classification section 301, and output the response signals after spreading to mapping section 304. Incidentally, the BPSK symbols outputted from modulating sections 101-1 to 101-$n$ are IQ-multiplexed in IQ multiplexing section 302, and therefore m=n/2.

Mapping section 304 maps the response signals after spreading to a plurality of subcarriers forming an OFDM symbol, and outputs the mapped response signals to multiplexing section 107. That is, mapping section 304 maps the DPCCH of each mobile station to a plurality of subcarriers forming an OFDM symbol.

Next, the classification processing in classification section 301 and the IQ multiplexing in IQ multiplexing section 302 will be described in detail.

In the following explanation, as described in Embodiment 4, the mobile stations to which the SCCH is assigned are mobile stations 1 to 3 (MS 1 to MS 3). Further, the mobile stations near the center of a cell amongst mobile stations 1 to 3 are mobile stations 1 and 2, and the mobile station near a cell boundary are mobile stations 3. Further, mobile station 1 is located closer to base station 200 than mobile station 2. Further, by control signal generating section 201, the aggregation size of one CCE is set for the SCCH for mobile station 1, the aggregation size of two CCEs is set for the SCCH for mobile station 2, and the aggregation size of four CCEs is set for the SCCH for mobile station 3. That is, the response signal to mobile station 1 is transmitted using one of DPCCH 1 to DPCCH 8, the response signal to mobile station 2 is transmitted using either DPCCH 1, DPCCH 3, DPCCH 5 or DPCCH 7, and the response signal to mobile station 3 is transmitted using either DPCCH 1 or DPCCH 5. The threshold value of the aggregation sizes is four CCEs, as shown in FIG. 14. Further, the mobile stations share the same threshold value as the threshold value (FIG. 14) in classification section 301 in base station 300.

Figure 20:
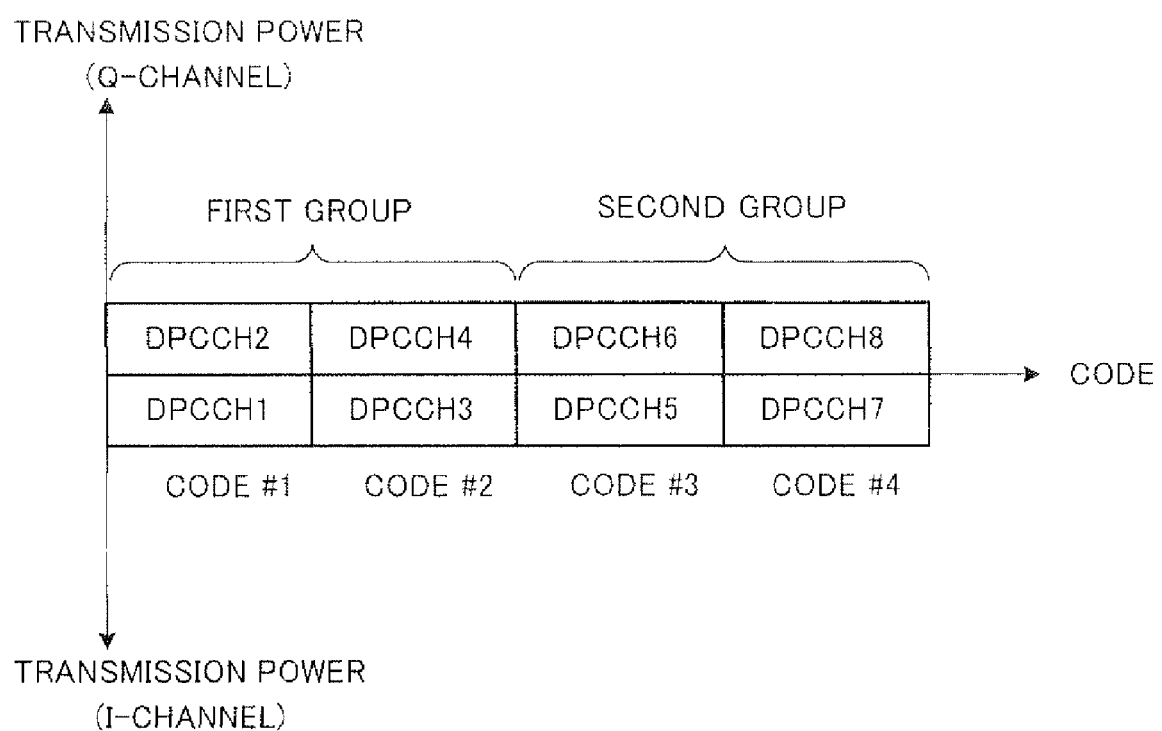
FIG. 20 illustrates the associations between DPCCHs and groups (example 1), according to Embodiment 5.

Here, with the present embodiment, grouping in classification section 301 is carried out according to associations between DPCCHs and groups as shown in FIG. 20. In FIG. 20, DPCCH 1 to DPCCH 4 form a first group and DPCCH 5 to DPCCH 8 form a second group. Further, DPCCH 1 and DPCCH 2 are IQ-multiplexed, DPCCH 3 and DPCCH 4 are IQ-multiplexed, DPCCH 5 and DPCCH 6 are IQ-multiplexed, and DPCCH 7 and DPCCH 8 are IQ-multiplexed.

Therefore, according to the aggregation size determined in control signal generating section 201, classification section 301 can classify the DPCCHs for the mobile stations into a plurality of groups, that is, into a group, to which the DPCCHs of the higher transmission power belong, and a group, to which the DPCCHs of the lower transmission power belong.

Further, classification section 301 assigns code #1 for DPCCH 1 and DPCCH 2, assigns code #2 for DPCCH 3 and DPCCH 4, assigns code #3 for DPCCH 5 and DPCCH 6, and assigns code #4 for DPCCH 7 and DPCCH 8. Therefore, a signal in which DPCCH 1 and DPCCH 2 are IQ multiplexed is spread with spreading code #1, a signal in which DPCCH 3 and DPCCH 4 are IQ multiplexed is spread with spreading code #2, a signal in which DPCCH 5 and DPCCH 6 are IQ multiplexed is spread with spreading code #3, and a signal in which DPCCH 7 and DPCCH 8 are IQ multiplexed is spread with spreading code #4.

Then, according to the classification result in classification section 301, IQ multiplexing section 302 IQ-multiplexes the DPCCHs for the mobile stations.

Figure 21:
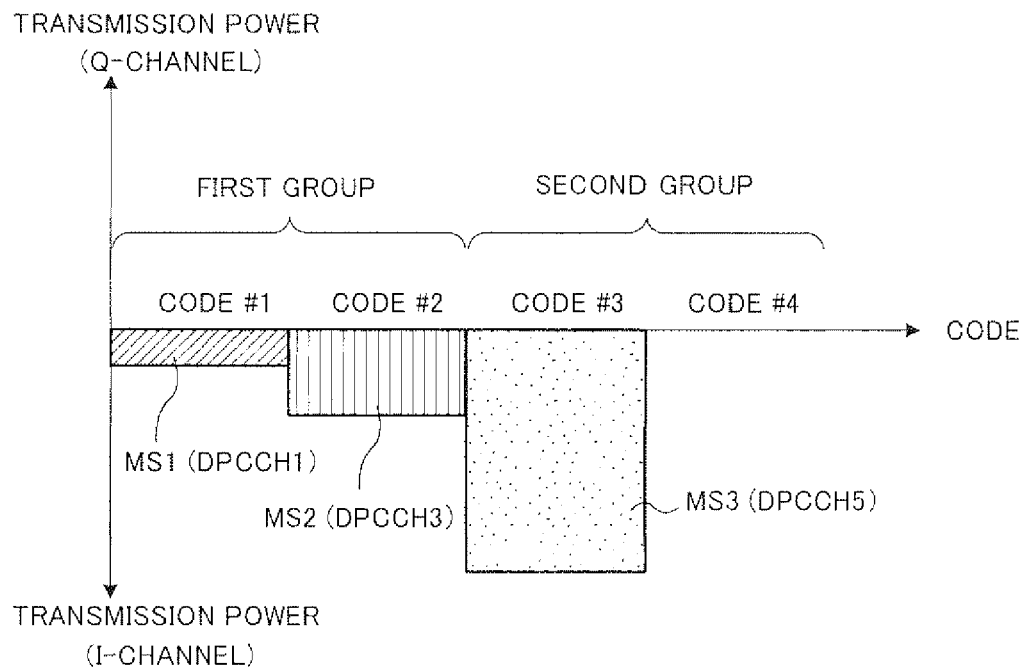
FIG. 21 shows an IQ multiplexing example of DPCCHs (example 1), according to Embodiment 5.

To be more specific, for example, when the DPCCH, which has an aggregation size of four CCEs and which is for mobile station 3, is DPCCH 5, the DPCCH, which has an aggregation size of two CCEs and which is for mobile station 2, is DPCCH 3, and the DPCCH, which has an aggregation size of one CCE and which is for mobile station 1, is DPCCH 1, the DPCCHs are IQ-multiplexed as shown in FIG. 21.

Figure 22:
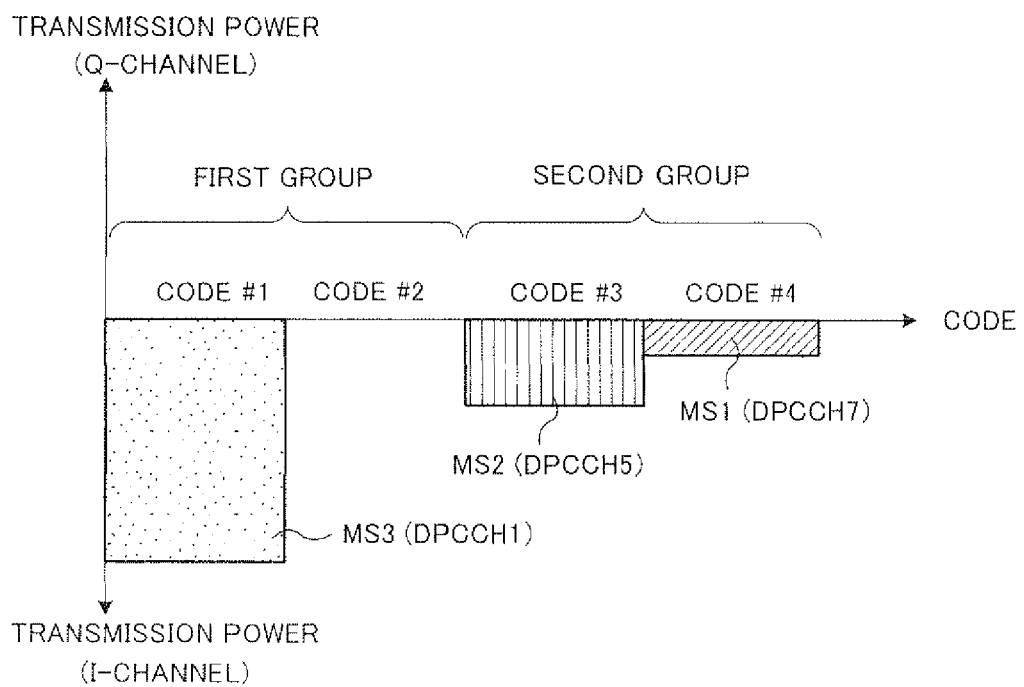
FIG. 22 shows an IQ multiplexing example of DPCCHs (example 2), according to Embodiment 5.

Further, for example, when the DPCCH, which has an aggregation size of four CCEs and which is for mobile station 3, is DPCCH 1, the DPCCH, which has an aggregation size of two CCEs and which is for mobile station 2, is DPCCH 5, and the DPCCH, which has an aggregation size of one CCE and which is for mobile station 1, is DPCCH 7, the DPCCHs are IQ-multiplexed as shown in FIG. 22.

That is, the DPCCH (DPCCH with high transmission power), which is for mobile station 3 having a threshold aggregation size or greater (i.e. DPCCH of the larger aggregation size) and the DPCCH (DPCCH with low transmission power), which is for mobile stations 1 and 2 having under a threshold aggregation size (i.e. DPCCH of the smaller aggregation size) are IQ-multiplexed on different code resources.

Consequently, by this IQ-multiplexing, response signals with high transmission power are IQ-multiplexed on the same code resources, and response signals with low transmission power are IQ-multiplexed on the same code resources. Further, response signals with the high transmission power and response signals with the low transmission power are IQ-multiplexed on different code resources. By this means, with the present embodiment, it is possible to decrease the difference of transmission power between DPCCHs IQ-multiplexed on the same code resources.

As described above, the degree of degradation of error rate performances in each DPCCH due to occurrence of interference between I-channel and Q-channel depends on relative relationships between magnitudes of the transmission power of DPCCHs. Consequently, according to the present embodiment, it is possible to suppress the influence of interference between I-channel and Q-channel for DPCCHs with low transmission power from DPCCHs with high transmission power, and suppress the degradation of error rate performances of DPCCHs with low transmission power, that is, suppress the degradation of error rate performances of response signals for mobile stations near the center of a cell.

Figure 23:
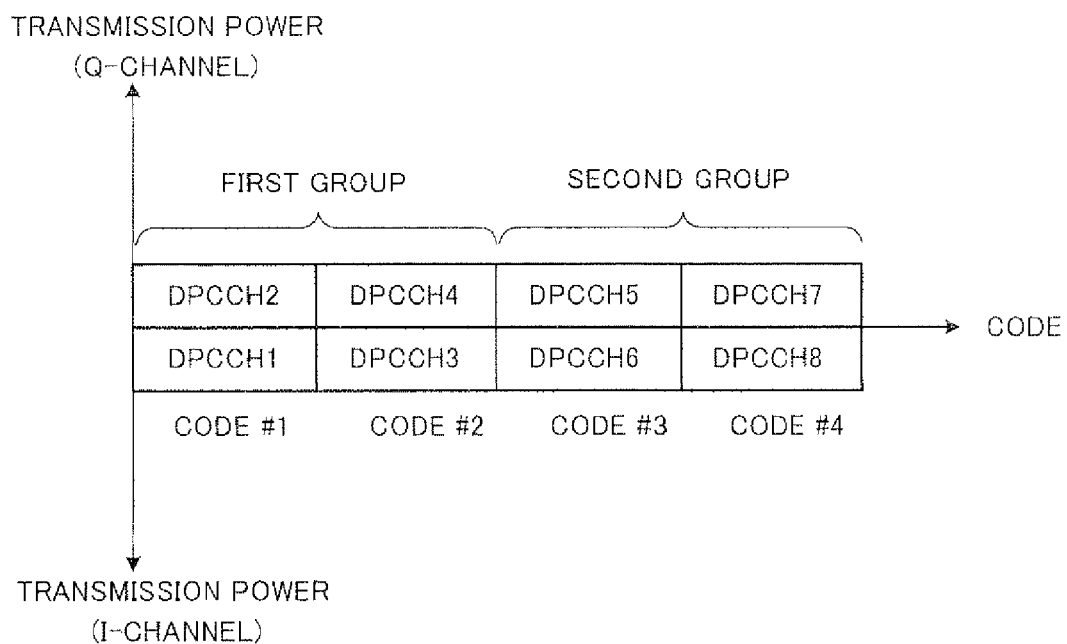
FIG. 23 illustrates the associations between DPCCHs and groups (example 2), according to Embodiment 5.

The grouping in classification section 301 may be carried out according to associations between the DPCCHs and the groups as shown in FIG. 23. Similar to the above, even when these associations are used, it is possible to IQ-multiplex the DPCCH (DPCCH with high transmission power), which is for mobile station 3 having a threshold aggregation size or greater (i.e. DPCCH of the larger aggregation size) and the DPCCH (DPCCH with low transmission power), which is for mobile stations 1 and 2 having under a threshold aggregation size (i.e. DPCCH of the smaller aggregation size) on different code resources.

Figure 24:
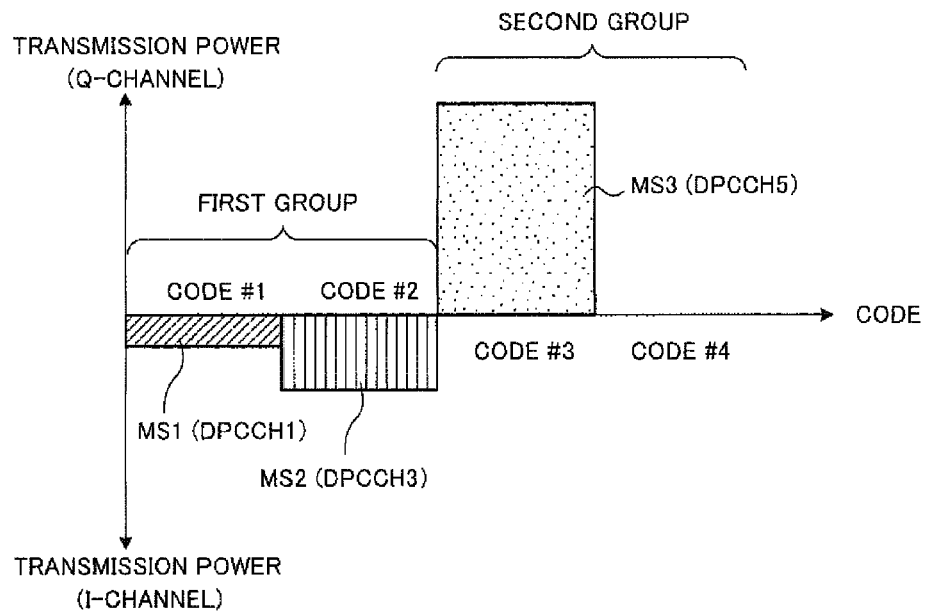
FIG. 24 shows an IQ multiplexing example of DPCCHs (example 3), according to Embodiment 5.
Figure 25:
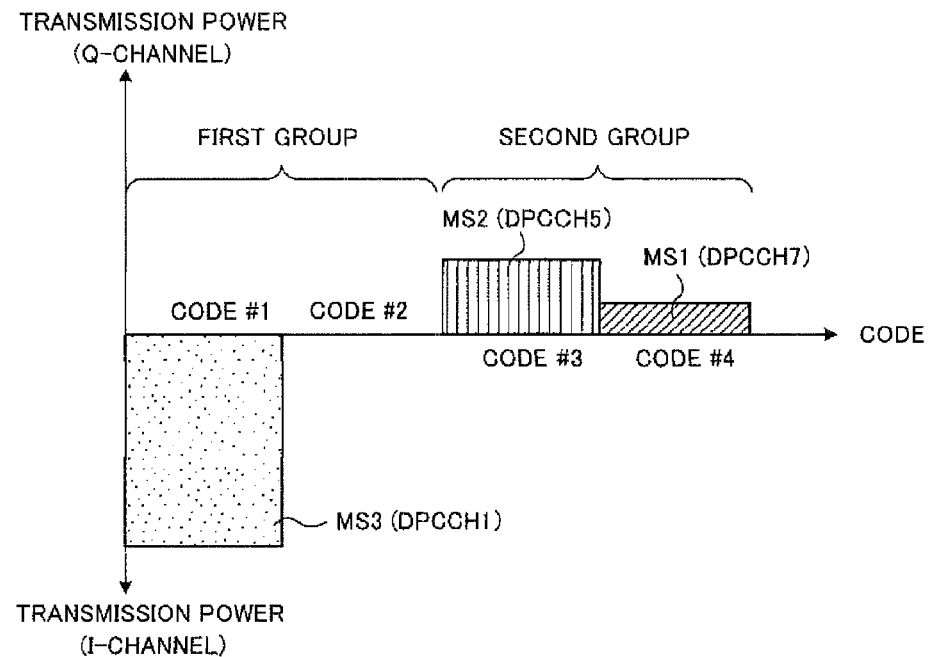
FIG. 25 shows an IQ multiplexing example of DPCCHs (example 4), according to Embodiment 5.

Further, by using the associations shown in FIG. 23, as shown in FIG. 24, in the case where the DPCCH (DPCCH with high transmission power), which is for mobile station 3 having a threshold aggregation size or more (i.e. DPCCH of the larger aggregation size), is multiplexed on Q-channel, the DPCCH (DPCCH with low transmission power), which is for mobile stations 1 and 2 having under a threshold aggregation size (i.e. DPCCH of the smaller aggregation size) is multiplexed on I-channel. Further, as shown in FIG. 25, in the case where the DPCCH (DPCCH with high transmission power), which is for mobile station 3 having a threshold aggregation size or greater (i.e. DPCCH of the larger aggregation size), is multiplexed on I-channel, the DPCCH (DPCCH with low transmission power), which is for mobile stations 1 and 2 having under a threshold aggregation size (i.e. DPCCH of the smaller aggregation size) is multiplexed on Q-channel. Therefore, by using the associations shown in FIG. 23, it is possible not only to suppress the degradation of error rate performances due to occurrence of interference between I-channel and Q-channel, and suppress the degradation of error rate performances between inter-code interference.

Embodiment 6

Figure 27:
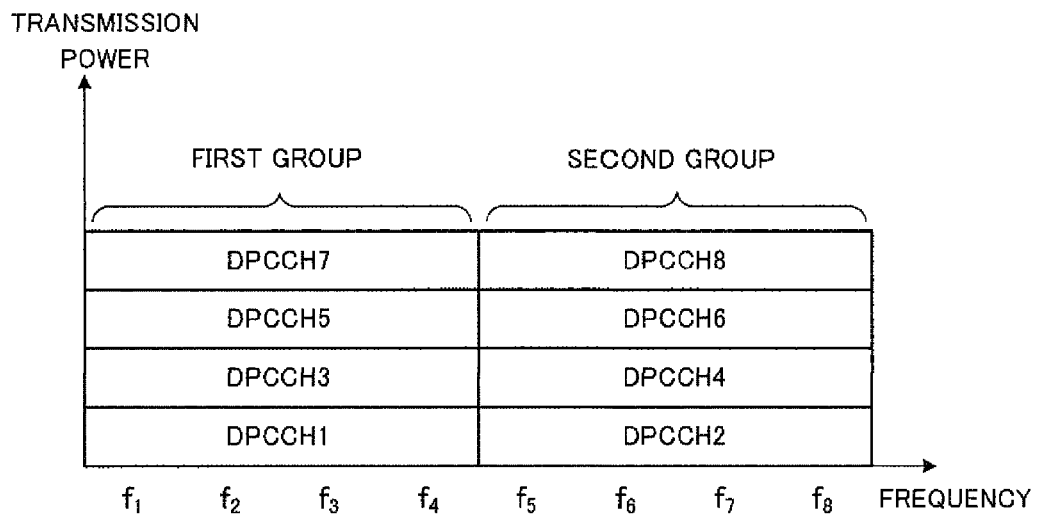
FIG. 27 illustrates the associations between DPCCHs and groups according to Embodiment 6.

The present embodiment is different from Embodiment 4 in that the threshold value of the aggregation size is two CCEs as shown in FIG. 26. Further, the present embodiment is different from Embodiment 4 in that grouping in classification section 202 (FIG. 12) is carried out according to associations between the DPCCHs and the groups as shown in FIG. 27.

Therefore, with the present embodiment, the DPCCH belonging to the first group may be used as the DPCCH, which is for mobile stations having a threshold aggregation size or greater (i.e. DPCCH of the larger aggregation size), and, meanwhile, the DPCCH belonging to the second group is not used as the DPCCH, which is for mobile stations having a threshold aggregation size or greater (i.e. DPCCH of larger aggregation size). In other words, the DPCCHs belonging to the second group are only used as the DPCCHs for mobile stations in which the aggregation size is less than the threshold (i.e. DPCCH of smaller aggregation size).

That is, in the present embodiment, the groups, the first group and the second group, are formed depending on the aggregation sizes.

Consequently, according to the present embodiment, as described in Embodiment 4, it is possible to code-multiplex the DPCCH (DPCCH with high transmission power) which is for mobile stations having a threshold aggregation size or greater (i.e. DPCCH of the larger aggregation size) and the DPCCH (DPCCH with low transmission power) which is for mobile stations having under a threshold aggregation size (i.e. DPCCH of the smaller aggregation size) on different frequency resources.

Therefore, according to the present embodiment, similar to Embodiment 4, it is possible to suppress the influence of inter-code interference of DPCCHs with low transmission power from DPCCHs with high transmission power, and suppress the degradation of error rate performances of DPCCHs with low transmission power, that is, suppress the degradation of error rate performances of response signals for mobile stations near the center of a cell.

Embodiment 7

Figure 28:
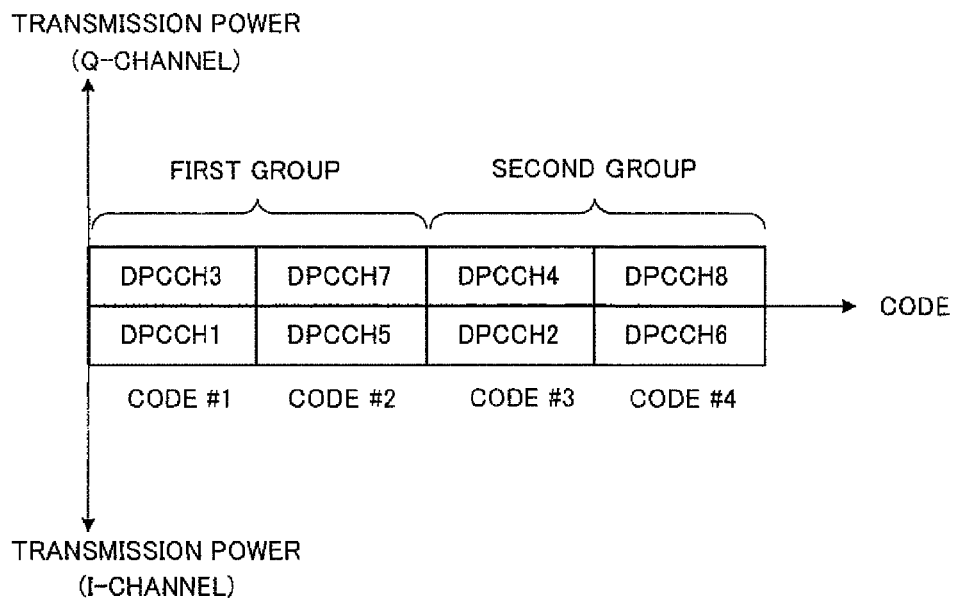
FIG. 28 illustrates the associations between DPCCHs and groups according to Embodiment 7.

The present embodiment is different from Embodiment 5 in that the threshold value of the aggregation size is two CCEs as shown in FIG. 26. Further, the present embodiment is different from Embodiment 5 in that grouping in classification section 301 (FIG. 19) is carried out according to associations between the DPCCHs and the groups as shown in FIG. 28.

Therefore, with the present embodiment, the DPCCH belonging to the first group may be used as the DPCCH, which is for mobile stations having a threshold aggregation size or greater (i.e. DPCCH of the larger aggregation size), and, meanwhile, the DPCCH belonging to the second group is not used as the DPCCH, which is for mobile stations having a threshold aggregation size or greater (i.e. DPCCH of the larger aggregation size). In other words, the DPCCHs belonging to the second group are only used as the DPCCHs for mobile stations having under a threshold aggregation size (i.e. DPCCH of the smaller aggregation size).

That is, in the present embodiment, the groups, the first group and the second group, are formed depending on the aggregation sizes.

Consequently, according to the present embodiment, as described in Embodiment 5, it is possible to IQ-multiplex the DPCCH (DPCCH with high transmission power) which is for mobile stations having a threshold aggregation size or greater (i.e. DPCCH of the larger aggregation size) and the DPCCH (DPCCH with low transmission power) which is for mobile stations having under a threshold aggregation size (i.e. DPCCH of the smaller aggregation size) on different code resources.

Therefore, according to the present embodiment, similar to Embodiment 5, it is possible to suppress the influence of interference between I-channel and Q-channel for DPCCHs with low transmission power from DPCCHs with high transmission power, and suppress the degradation of error rate performances of DPCCHs with low transmission power, that is, suppress the degradation of error rate performances of response signals for mobile stations near the center of a cell.

Embodiments of the present invention have been explained.

Although mapping processing in subcarrier units has been explained with the embodiments as an example, mapping processing may be performed in resource block units, grouping a plurality of subcarriers. Moreover, a resource block may be referred to as "sub-band," a "subchannel," a "subcarrier-block," or a "chunk."

The subframes used in the above explanation may be other transmission time units such as time slots and frames.

Further, a mobile station may be referred to as "UE," base station may be referred to as "Node-B," and a subcarrier may be referred to as "tone." Further, a CP may be referred to as a "guard interval (GI)."

Further, in the DPCCH, control signals such as PI (Paging Indicator) and a random access response, besides a response signal (an Ack or a Nack signal) may be transmitted.

Further, the prevent invention is applicable to all signals subject to control of the transmission power and subject to frequency multiplexing and code-multiplexing, besides a response signal.

Further, in the above explanation, it is only necessary to transmit the SCCH before transmission of the DPCCHs, the SCCH may be time-multiplexed on the positions other than the beginning of a subframe, for example, on the position of a second OFDM symbol in a subframe.

Further, the transform method between the frequency domain and the time domain is not limited to IFFT or FFT.

Further, the method of frequency multiplexing is not limited to OFDM.

Further, the method of code multiplexing is not limited to spreading using spreading codes. For example, in the present invention, spread multiplexing using DFT (Discrete Fourier Transform), code multiplexing using CAZAC codes (Constant Amplitude Zero Autocorrelation) and the like may be used.

Further, although cases have been explained with the embodiments above where mobile stations near the center of a cell and mobile stations near a cell boundary are identified based on the MCSs for SCCHs, mobile stations near the center of a cell and mobile stations near a cell boundary may be identified based on uplink parameters the base station sets up (i.e. the MCSs of uplink data, the power of uplink transmission, or the amount of delay of transmission timings of uplink data). Consequently, based on the MCSs of uplink data, the power of uplink transmission, or the amount of delay of transmission timings of uplink data and the like, a plurality of DPCCHs may be classified into a plurality of groups according to the magnitudes of the transmission power.

Further, as described above, transmission power control section 102 controls the power to transmit the response signals based on the received quality information reported from the mobile stations, so that classification section 118 may classify a plurality of DPCCHs into a plurality of groups based on the received quality information reported from the mobile stations. By adopting this classification method, as described above, it is possible to classify a plurality of DPCCHs into a plurality of groups according to the magnitudes of the transmission power.

The DPCCH in the explanation with the embodiments is used as a channel to feed back an ACK signal or a NACK signal in ARQ, and therefore may be referred to as a "ACK/NACK channel" or "PHICH (Physical Hybrid ARQ Indicator Channel)."

The SCCH in the explanation in the embodiments above may be any channel as long as control channels to report the allocation result of uplink data resources. For example, a PDCCH (Physical Downlink Control Channel) may be used instead of the SCCH.

Further, the present invention may be implemented as explained above, even when aggregation sizes are greater than four CCEs, for example, eight CCEs or sixteen CCEs.

Further, the present invent ion may be implemented as explained above, even when CCEs occupied in a SCCH are limited per aggregation size.

Further, the present invention may be implemented as explained above, even when response signals are transmitted using DPCCHs corresponding to CCEs of the maximum number in a plurality of aggregated CCEs. That is, correspondence relationships between CCEs and DPCCHs may be subject to known rules between the base station and the mobile stations.

Further, the threshold value shared by the base station and the mobile stations may be a threshold value reported from the base station to the mobile stations using broadcast channels or control channels, or, may be a fixed threshold value that the base station and the mobile stations hold in advance.

Further, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSIs, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosures of Japanese Patent Application No. 2007-005154, filed on Jan. 12, 2007 and Japanese Patent Application No. 2008-000795, filed on Jan. 7, 2008, including the specifications, drawings and abstracts, are incorporated herein by reference in their entirety.

INDUSTRIAL APPLICABILITY

The present invention is applicable to, for example, mobile communication systems.

The invention claimed is:

1. A base station apparatus configured for code-multiplexing a plurality of dedicated control channels on a plurality of subcarriers forming a multicarrier signal, the apparatus comprising:
   a classification section configured to classify the plurality of dedicated control channels into a plurality of groups, which are respectively associated with different transmission powers, the classification being based on a transmission power for each of the plurality of dedicated control channels; and
   a mapping section configured to map the dedicated control channels classified into the same group to the same subcarrier, and to map the dedicated control channels classified into different groups to different subcarriers.

2. The base station apparatus according to claim 1, wherein the classification section classifies the plurality of dedicated control channels into the plurality of groups based on modulation and coding schemes for a plurality of shared control channels corresponding to the plurality of dedicated control channels.

3. The base station apparatus according to claim 2, wherein the classification section compares a threshold value, which is the same as a mobile station apparatus threshold value, and the modulation and coding schemes, and classifies the plurality of dedicated control channels into the plurality of groups according to the comparison result.

4. The base station apparatus according to claim 1, wherein the classification section classifies the plurality of dedicated control channels into the plurality of groups such that a number of dedicated control channels classified into each of the plurality of groups is equal.

5. The base station apparatus according to claim 4, wherein the classification section arranges the plurality of dedicated control channels in an order of levels of modulation and coding schemes for a plurality of shared control channels corresponding to the plurality of dedicated control channels, and classifies the plurality of dedicated control channels into the plurality of groups according to the order.

6. The base station apparatus according to claim 1, wherein a plurality of shared control channels are associated with the plurality of groups, and the base station apparatus further comprises an assignment section configured to assign the plurality of shared control channels to a plurality of mobile station apparatuses according to the classification result in the classification section.

7. The base station apparatus according to claim 1, wherein the mapping section maps the dedicated control channels classified into the group associated with a higher transmission power to a larger number of subcarriers.

8. The base station apparatus according to claim 1, wherein the classification section classifies the plurality of dedicated control channels into the plurality of groups based on aggregation sizes of control channel elements occupied in a plurality of shared control channels corresponding to the plurality of dedicated control channels.

9. The base station apparatus according to claim 8, wherein the classification section compares a threshold value, which is the same as a mobile station apparatus threshold value, and the aggregation sizes, and classifies the plurality of dedicated control channels into the plurality of groups according to the comparison result.

10. A radio communication method for code-multiplexing a plurality of dedicated control channels on a plurality of subcarriers forming a multicarrier signal, the method comprising:
   classifying the plurality of dedicated control channels into a plurality of groups, which are respectively associated with different transmission powers, based on a transmission power for each of the plurality of dedicated control channels; and
   mapping the dedicated control channels classified into the same group to the same subcarrier, and mapping the dedicated control channels classified into different groups to different subcarriers.

* * * * *